US010352759B1

(12) United States Patent
Jensen

(10) Patent No.: US 10,352,759 B1
(45) Date of Patent: Jul. 16, 2019

(54) SMART TABLEWARE SYSTEM, APPARATUS AND METHOD

(71) Applicant: OBE, Inc., Modesto, CA (US)

(72) Inventor: Hilary Jane Jensen, Modesto, CA (US)

(73) Assignee: OBE INC., Mill Valley, CA (US)

(*) Notice: Subject to any disclaimer, the term of this patent is extended or adjusted under 35 U.S.C. 154(b) by 0 days.

(21) Appl. No.: 16/154,372

(22) Filed: Oct. 8, 2018

Related U.S. Application Data

(63) Continuation-in-part of application No. 15/150,277, filed on May 9, 2016, now Pat. No. 10,091,972.

(60) Provisional application No. 62/159,171, filed on May 8, 2015.

(51) Int. Cl.
*G01G 19/414* (2006.01)
*A47G 19/02* (2006.01)
*A47G 23/12* (2006.01)
*A01K 7/02* (2006.01)
*A01K 5/02* (2006.01)

(52) U.S. Cl.
CPC ....... *G01G 19/4146* (2013.01); *A47G 19/025* (2013.01); *A47G 23/12* (2013.01); *A01K 5/0283* (2013.01); *A01K 5/0291* (2013.01); *A01K 7/02* (2013.01)

(58) Field of Classification Search
CPC .. G01G 19/4146; A47G 19/025; A47G 23/12; A01K 5/0283; A01K 5/0291; A01K 7/02
See application file for complete search history.

(56) References Cited

U.S. PATENT DOCUMENTS

| 2014/0032121 A1* | 1/2014 | Wang | ................... G01N 33/02 |
| | | | 702/19 |
| 2014/0257753 A1* | 9/2014 | Wang | ....................... A01K 5/02 |
| | | | 702/188 |

* cited by examiner

*Primary Examiner* — Leon Flores
(74) *Attorney, Agent, or Firm* — Staniford Tomita LLP

(57) ABSTRACT

A smart apparatus system includes one or more food and liquid smart tableware apparatuses that each have a processor, memory, and a weight sensor. The smart apparatuses communicate with a cloud server and one or more caretaker computing devices. The caretakers can input physical information for the user including weight. The smart apparatus system can determine the healthy weight range for the user and determine a recommended feeding schedule. The smart apparatus system can remind the caretakers to feed the user, monitor the quantity of food and liquid that are placed in the smart tableware apparatuses and the consumption of the food and water by the user and transmit reports to the caretaker's computing device(s). The smart tableware apparatus system can maintain the recommended feeding schedule to keep the user within the healthy weight range or adjust the feeding schedule to bring the user's weight within the healthy weight range.

28 Claims, 16 Drawing Sheets

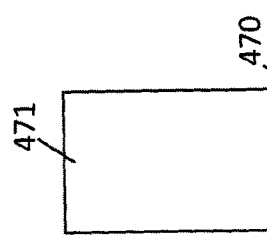
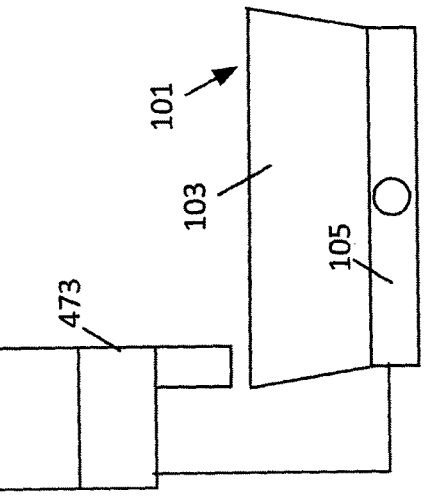
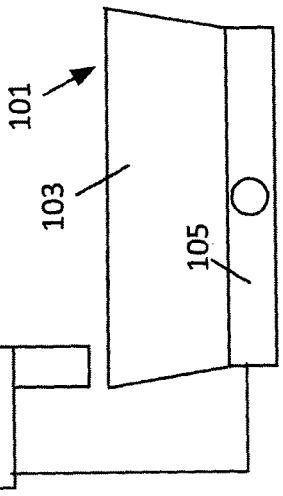
FIG. 24
FIG. 25
FIG. 26

SMART TABLEWARE SYSTEM, APPARATUS AND METHOD

CROSS REFERENCE TO RELATED APPLICATIONS

This application is a continuation in part of U.S. patent application Ser. No. 15/150,277 "Smart Pet Feeding And Monitoring System" filed May 9, 2016, now U.S. Pat. No. 10,091,972 which claims priority to U.S. Provisional Patent Application No. 62/159,171, "Smart Pet Feeding And Monitoring System" filed May 8, 2015, which is hereby incorporated by reference in its entirety.

FIELD OF THE INVENTION

The present invention relates to a smart tableware such as plates, bowls, drinking glasses, containers, apparatus and method that monitors and records, evaluates and recommends the caloric content and amount of food and water a human or animal should consume or consumes.

BACKGROUND

We all want to live long, happy and healthy lives. And we want our pets to do the same. What one eats and drinks taking into account activity level is a major influence on health and happiness of humans and animals. With our busy pace of life it can be difficult to track and understand what one consumes on a daily, weekly or yearly basis. And measuring and monitoring our consumption and behavior may make us aware of things we take for granted or that are easily missed. And if we track what we consume and what we do, it is easier for caretakers like physicians, trainers, coaches or even parents to make specific, personalized recommendations to improve nutrition, improve performance, lose, gain or maintain weight. Until now, it has not been practical to track everything we eat and drink and then to use that information to make personalized, daily, or real-time recommendations. Until now.

It is now possible to connect every day devices to a network i.e. via Wi-Fi and record, track, measure, weigh, test and sample what they interact with. Widely referred to as The Internet of Things, the quantified human and pet is here. And using Machine Learning and AI to analyze the endless amounts of data that can now be collected, enables us to compare these large data samples to an individual—and make highly specific recommendations, fine tuned regimens and therapies that will help humans and pets manage and monitor their intake, seamlessly and when applied and adhered to, we can improve our health and mental wellbeing.

Humans

Obesity, a worldwide epidemic, and causes increased risk for multiple serious conditions, including type 2 diabetes, cardiovascular diseases, nonalcoholic fatty liver disease and cancer which can shorten the human life span, decrease quality of life and cost tremendous amounts of money to treat, reverse and/or to slow the decline in health. Modern day life has introduced key contributors to obesity, including but not limited to: high caloric foods that are readily available and inexpensive; transportation that decreases the requirements for the amount of physical activity required on a daily basis; and more and more the ability have almost anything delivered to your home for minimal to no (perceived) cost. The result is that the caloric impact of food has become hard to understand, track, measure and compare relative to the amount of activity it takes to maintain the same weight, or to lose weight and even gain weight.

On the therapeutic side detailed tracking of consumption is useful to help rehabilitate or maintain health, or even optimize a high performing athlete's physical performance. For example, those who may not be physically or mentally capable of monitoring their food and fluid intake like the very sick, very young, or very old. Enabling caretakers like nurses, doctors, nutritionists, trainers and coaches to track the individual with no effort on the individual's part will make therapy, training and rehabilitation easier to assess what they need, like in a hospital or treatment center.

Animals and Pets

More than half of pets (dogs and cats) are overweight or obese which shortens their life spans and causes expensive, painful health problems like diabetes and arthritis. Helping humans feed their pets the right amount, and making it easy to do so, will help dogs and cats live longer healthier lives. In a broader category, like farm animals, understanding what livestock consume can also improve the health of the individual animal and overall herd/group improving yields-of eggs or milk for example. And just like fine tuning an athlete's nutrition and consumption, a race horse's health and performance could be quantified and improved helping them win more races, recover from injuries or live longer to breed.

Therefore, what is needed is a smart eating, feeding and drinking (consumption) system/platform that makes it easy and seamless to measure, monitor, limit and even increase when necessary, caloric and fluid intake and that dynamically assesses consumption in real-time, making highly specialized and relevant recommendations and changes in regimen that will improve human and animal health and happiness.

SUMMARY OF THE INVENTION

The present invention is directed towards a system and apparatus for measuring, managing and guiding the optimal amounts of the food and water, fluid, vitamins or medicine or compliance with a regiment consumption of one or more humans and animals. The device personalizes the recommendation and evaluation for a human or animal based on their physical characteristics, like weight, height and physical activity level, calories burned so that an individual can manage weight loss, gain or maintenance based on their personal characteristics, and the amount of food and liquid they consume. The invention translates the weight of the food/liquid consumed, into calories and then compares that intake to activity level and caloric requirements. While some of the descriptions are specifically associated with pets, all described embodiments are intended to also be applicable to humans.

Food, water, fluid intake doesn't only play a role in happiness. A change in eating and drinking habits can be an indicator that there is something wrong, acting as an early predictor of a health problem to come. A decline in appetite or an increase in thirst are often the first signs to individuals or doctors that they may be sick. Quantifying that change in intake may help diagnose problems earlier than could be observed by a caretaker or individual.

It can be difficult for many of us to understand the food labels or listed caloric content when purchasing food and then to translate that into personalized food servings real-time. For pets for example, how many calories a specific pets may need on a daily basis versus the pet food label recommendations, how good the pet food is for their pets and what value for the money the purchased pet food is providing. Or for humans, remembering how much they consumed for breakfast and lunch, and then to adjust their dinner caloric intake accordingly is laborious.

An individual's nutrition, water and feeding needs vary based on age and activity level. What is in the food and water affects the health and wellbeing of the user and the user's health. A human and animal's nutrition, dietary and hydration requirements change over time based on factors including: age, activity level, breed/kind, sex, surgery history, biome make-up, genetics and/or need to lose/gain weight. Being able to dynamically address these changes will help more humans and animals maintain an optimal weight to to ensure they are properly nourished-getting their daily recommended vitamins.

Individualized data is as important as collective data across different populations, groups, breeds. Comparing individual data with other groups with similar activities, ages, diets, species, breed or fluid consumption will provide objective data that can be analyzed for trends and improvements and applied to the individual and visa versa. The smart system enables both analysis of an individual's consumption and nutrition compared to a bigger population but also supports making specific recommendations over time based on factors like health, nutrition, age, location, weather, altitude, pollution, water quality or fluid intake.

Devices and commercial products for human and pet-care include activity trackers, scales, smart phones, electronic apps, software, automatic pet feeders, remote pet feeders, ratings on dog foods, cookbooks, and websites/blogs with advice. Doctors, nutritionists or weight loss programs like Weight Watchers are good sources of advice and can help with a weight loss regimen and increasing activity. Willpower will always play a role in human fitness and health, but doctors, weight loss programs, and nutritionists do not have a direct source of objective, and real-time information to inform the advice that they give. And if an individual does not comply with the regimen, there isn't objective, trended data revealing that to the caretaker or the individual which can hamper success and reinforcement of good habits. Veterinarians are often a source for more objective information on pet nutrition, but because they make money off of the products they sell, some consumers discount their advice moreover, visits to the vet are expensive and out of pocket most of the time. Pet activity monitors have been introduced to help monitor the activity of one's pet and to ensure that one is getting value for your money with a dog-walker for example or to ensure one is getting enough exercise or activity. GPS trackers may help track and/or locate people or pets. For pets, these are often bulky, require a collar, and require a monthly fee for the service. Smart-collars have also entered the market. They give real-time status of the dog, if the dog is wearing the collar. For humans, these devices do not measure consumption so the full picture of a person's health is missing as it relates to activity, nutrition and consumption.

The invention enables weighing, managing and monitoring and analyzing of the amount of food and water an individual human or animal consumes. There is a need for a device that measures and recommends portions and food no matter the type of food including human or animal food: pre-packaged food, 'fast food', fresh meat or vegetables, canned, wet, dry, raw or freeze dried etc. There is also a need for a device that tracks whether and when the person or animal has eaten, drank, taken medication or been fed or given water. The device should also give reminders/alerts to take medication, drink water, eat more food, limit caloric intake, limit sugar content, avoid allergens or feed the pet or change or add water to his apparatus. Although the term, "smart apparatus" is used throughout this patent application, the described apparatus, systems and methods can be used with any other types of food and water holders including: plates, food and water dispensers, feeders, etc. Although the terms, human, animal and pet are used throughout this patent application, the described apparatus, systems and methods can be used by any other types of self-standing analysis system or platform like a Machine Learning algorithm or method, Predictive Analytics algorithm, cloud or server infrastructure, drone, vehicle, robot, bot, software or hardware device capable of analyzing individual data and large amounts of data in order to make recommendations, warnings/alerts, or simply to monitor and report by specific users or by unidentifiable user information (UUID).

The inventive system also monitors a human's or animal's nutrition intake and/or monitors other attributes about the human or animal even if the human or animal is not wearing an activity tracker, activity sensor, a collar such as a smart collar or other tracking device. The inventive system can monitor a quantity of purchased food and the rate of consumption of the purchased food. In an embodiment, the inventive system can automatically reorder replenishment of food, vitamins, fluids, water based on what a person or animal consumes or a rate of food consumption. Running out of food at an inopportune time can cause humans and pet owners stress and worry. Missing a meal for an elderly patient can cause unneeded stress to the individual and family. Not drinking enough water on a hot day can cause dehydration which may lead to disorientation or other more serious even deadly problems like heat stroke. Not feeding the dog the same kind of food can be a source of stomach distress for pets or the opposite, eating the same food over an extended period of time may cause the pet to tire of the food or possibly even develop an allergy to the food. Avoiding allergens like gluten or chicken may be very important too. The smart device enables a log of the ingredients and can alert the consumer to a potential allergen, therefore avoiding stomach distress, allergic reactions or a trip to the hospital.

According to some embodiments, the inventive system is designed to help owners take better care of their pet (e.g., dog) by understanding more about their pet's status/wellbeing/behavior in real-time, observing and objectively measuring and monitoring their eating and drinking habits which can include caloric intake and every food ingredient ingested. In an embodiment, the inventive system can improve the nutrition of the pet by helping owners understand what is in the food that is fed to their dog and explaining how other vitamins, nutrients or new foods/oils might address health problems, allergies, stomach issues or even help them live longer. In some embodiments, the inventive system can be used to manage feeding schedules and amounts for a diet or hydration regimen. The inventive system can also help to coordinate the care of a pet in a multi-person household or with multiple pet caretakers, which can include owners and pet service providers such as dog-walker. The inventive system can manage the pet's care through a phone, text and/or social media messages in real-time, from anywhere. The device also manages and communicates the pet's needs such as: reminding pet owners to feed them, guiding them on how much to feed them and when to refresh their drinking water. If there is a dog food recall or a sudden change in behavior like an increase in drinking over a short period of time, the app and device will give instant alerts to protect the animal and to draw the owners' attention to an emergent concern.

In some embodiments, the inventive system can help individuals monitor and assess their own or for doctors to monitor their patient's compliance with a diet, medication or hydration regimen for weight loss, gain, improved athletic ability/performance. The inventive system includes a smart device that monitors and manages a human's or animal's health and care in real-time. The Wi-Fi and BLE (low energy blue tooth) connected apparatus combined with the smart app and cloud infrastructure offers proactive care, personalized to the individual's food and water consumption, kind of food (packaged, fast, raw, wet, dry), brand of food, age, size, activity level and breed, family habits and changing schedules.

The inventive apparatus system can be a central device in any home, gym, hospital, clinic or training facility that captures exhaustive amounts of data about an individual's eating and drinking behavior and compliance with a regiment. The apparatus can include components, which monitor wet, raw, freeze-dried and dry food in addition to water. Combined with the cloud functionality, the inventive system can help optimize a an individuals' nutrition and hydration by informing the person, doctor, therapist, coach or care taker about what the individual is consuming, eating and drinking, establishing trends over time and comparing consumption to other groups with the same characteristics, location, diet, activity level, stress level, noise, human or animal biome, genetic make-up, dogs of the same breed, location, environment, ambient temperature, age or size or to nutrition recommendation.

The inventive system tracks what is consumed out of the device by the human or animal. It tracks what is fed to the person or dog and signals a local or remote human user when enough has been put in the apparatus (so a person filling the apparatus knows when to stop filling the apparatus). The system tracks when the apparatus was last filled and reminds a human user to refill or change the water/fluid/food/medication if the refilling has not been performed per schedule. The apparatus stores a schedule based on user set preferences and communicates using lights whether the pet has been fed or not, or needs to be fed. In the absence of a predetermined schedule, the smart system tracks everything that is put in it and everything that is taken out of it over time. This time period may be personalized for the period that the consumer most cares about—like daily, weekly, monthly or even hourly or by minutes and seconds. In other embodiments, using sensors, like RFID, BLE, weight, motion, visual identity, finger prints, hand or paw size, DNA the apparatus tracks the consumption of that specific individual compared to others who may use the same device but have different personally identifiable differing characteristics or chemical make-up.

The inventive system enhances human and pet health and wellness especially nutrition and hydration while helping their caretakers manage their care. Many humans relate their pet's health and wellbeing to their own health and state of mind. The peace of mind and assurance a caretaker gets knowing real-time about behavior and consumption. For example, the care for a loved one in a medical facility can be a great source of worry if the family member is not able to attend to their care personally. The apparatus helps humans and computer systems and machines manage schedules, communication with caretakers, re-ordering food, medication or liquids before they run out and having it delivered to their doorstep (or mailbox or hospital room or training facility). If automatic delivery is not desired, the system may give reminders to pick it up while in a specific retail store, or when passing by a pet specialty store or specific location. The inventive system also helps manage security/care of the individual human or animal since what, how and when a person or animal eats or drinks is a major indicator of health, status and care. Having a human or computer system, software know/be alerted in real time whether the loved-one or animal has been fed, eaten, taken their medication, drank enough fluids or given water or vitamin provides instant reassurance and peace of mind or emergency alerts. The apparatus can also remind and/or alert others that there may be a problem if the feeding schedule or health regimen has not been followed or the individual has not eaten the normal quantity of food for a period of time or drank the optimal amount of fluid.

A pet's owner can use data from the smart apparatus system to understand what the pet is eating, establish trends over time and compare food consumption to other dogs of the same age or size or to nutrition recommendations. The smart apparatus system tracks the food that is fed to the dog and transmits a "full serving" signal to a local or remote human user when precisely one full serving for that scheduled feeding/or prescribed amount by day, week, hour, minute has been put in the apparatus. This signal is provided in real time so a person filling the smart apparatus/placing the food or medication on the plate and knows when to stop filling the smart apparatus with pet food or placing the food on the plate or fluid in the container/glass. The system tracks when the smart apparatus was last filled and reminds a human user to refill or change the water/fluid/food if the refilling has not been performed in accordance with a stored feeding schedule. The smart apparatus, server and smart phone can store a feeding schedule based on user set preferences and communicates using an output such as lights on a base portion of the smart apparatus system, sound or a smart home device like an Amazon Echo or Google Home or smart watch or phone to indicate whether the pet has been fed or not, or needs to be fed.

BRIEF DESCRIPTION OF THE DRAWINGS

FIGS. 24 and 25 illustrate an embodiment of a smart apparatus used with an access restriction cover.

FIG. 26 illustrates an embodiment of a smart apparatus used with a feeder or water mechanism.

DETAILED DESCRIPTION

Figure 1:
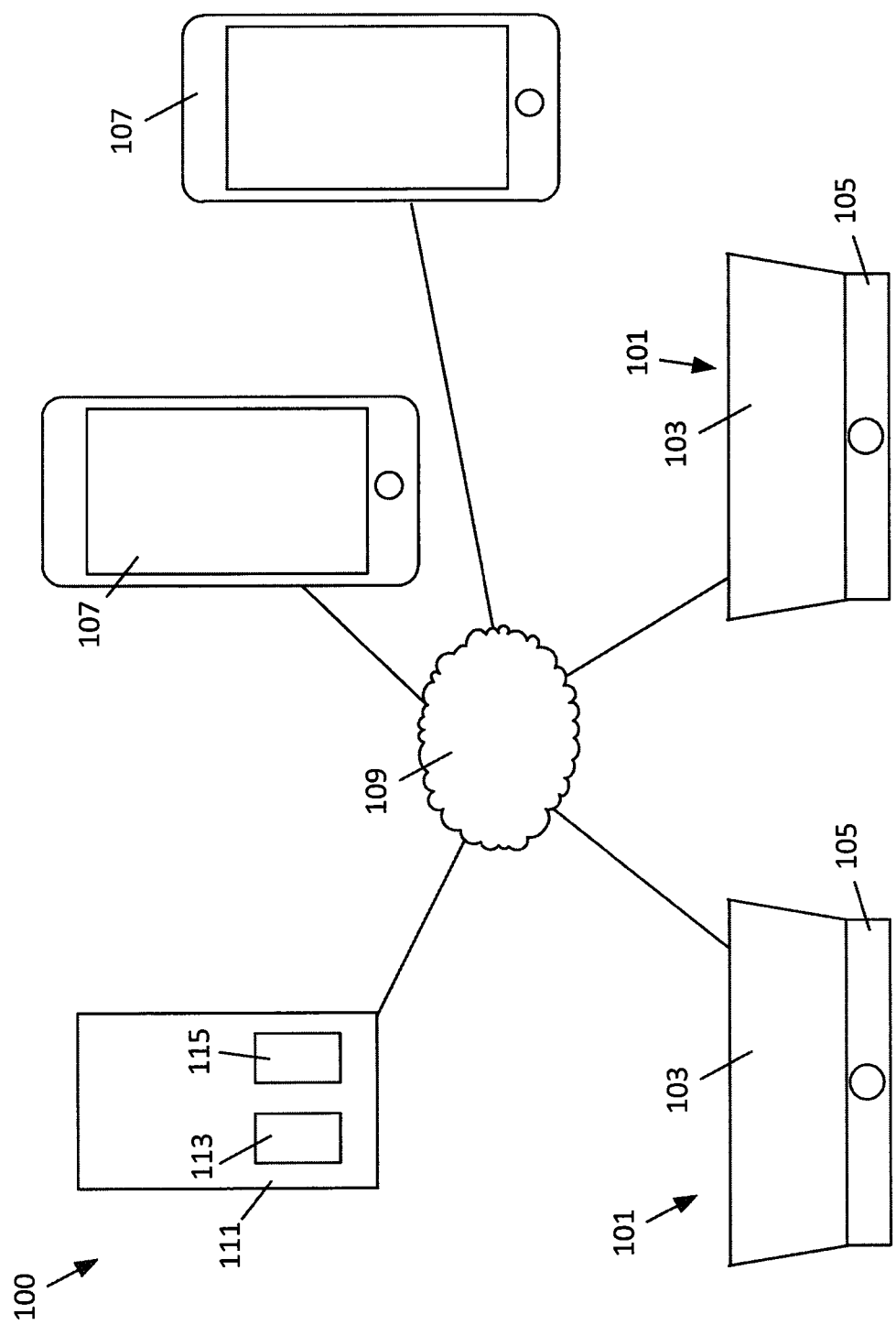
FIG. 1 illustrates an embodiment of a smart apparatus system.

It should be appreciated that the present invention can be implemented in numerous ways, including as a process, an apparatus, a system, a device, a method, or a computer-readable medium such as a computer-readable storage medium or embedded system containing computer-readable instructions or computer program code, or as a computer program product, comprising a computer-usable medium having a computer-readable program code embodied therein. In the context of this disclosure, a computer-usable medium or computer-readable medium may be any medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), embedded firmware, Software as a service platform (SaaS), or any magnetic, electromagnetic, infrared, optical, non-volatile memory or electrical means or system, apparatus or device for storing information. As an alternative or addition, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware, firmware download update over the Wi-Fi or RF, BLE connection, or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit or SaaS platform that enables the creation and implementation of the present invention. In this specification, these implementations, or any other form that the invention may take, may be referred to as techniques. In general, the order of the steps of disclosed processes may be altered within the scope of the invention. Although the terms, apparatus and smart apparatus are used throughout this patent application, the described apparatus, systems and methods can be used with any other types of food and water holders including: plates, food and water dispensers, feeders, etc.

Although the terms, human, animal and pet are used throughout this patent application, the described apparatus, systems and methods can be used by any other types of self-standing analysis system or platform like a Machine Learning algorithm or method, Predictive Analytics, cloud or server infrastructure, drone, vehicle, robot, bot, software or hardware device capable of analyzing individual data and large amounts of data in order to make recommendations, warnings/alerts or simply to monitor and report by specific user or generally with unidentifiable user information (UUID). While some of the descriptions are specifically associated with pets, these embodiments are intended to also be applicable to humans.

FIG. 1 is a system architecture illustrating one embodiment of a data storage system. Storage System 100 includes server 111, one or more computing devices 107 and one or more smart apparatuses 101. In some embodiments, the server 111, computing devices 107 and smart apparatuses 101 may be in communication using a dedicated communication link, one or more networks, a local area network, a wide area network, a storage area network, the Internet, a wired network, and/or wireless network, machine to machine network, mesh network, among others. Server 111 can include a processor 113 and a database 115. The server 111 may be connected to multiple storage devices through different connectors and over various types of connections. The computing devices 107 can be any user operated computing device having a processor, user interface, and memory. The computing devices can include: embedded systems, human or animal activity trackers, accelerometers, smart phones, tablet computers, heart monitors, blood, breath or saliva testing devices, or any other type of computer or sensor. The smart apparatuses 101 can include a apparatus 103 for holding pet food or water and a base 105, which supports the apparatus 103. The bases 105 can include processors and communication mechanisms for transmitting data to the server 111, Wi-Fi modules, RF connection and computing devices 107. In an embodiment, a smart apparatus software program can be downloaded from the server 111 to the computing devices 107 and stored in memory on the computing devices 107. The system described herein may be implemented using software, hardware, and/or a combination of software and hardware where software may be stored in an appropriate storage medium and executed by one or more processors.

Figure 2:
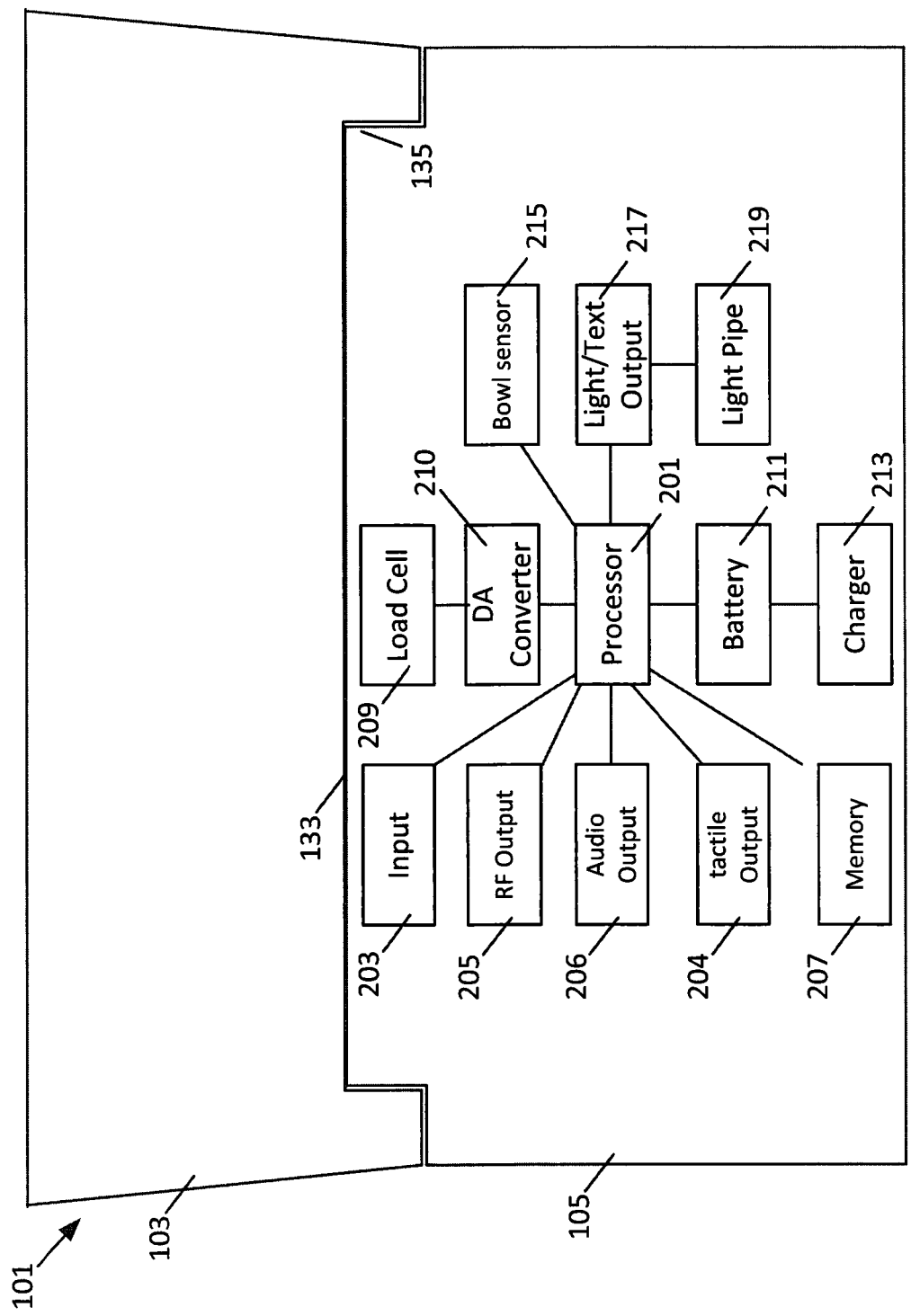
FIG. 2 illustrates a block diagram of an embodiment of a smart apparatus.

With reference to FIG. 2, a block diagram of an embodiment of a smart apparatus 101 is illustrated. The smart apparatus 101 can include a apparatus 103 for holding food or water, which is placed on a base 105 which can monitor the weight of the apparatus 103. The apparatus 103 can be made of a durable microwave and dishwasher safe material such as plastic or ceramic. Alternative apparatus materials include: stainless steel or other suitable materials.

The apparatus/container (may be flat or considered a dispenser) 103 can be available in various sizes depending upon the size of the pet using the smart apparatus 101. For example, a small apparatus 103 may hold 2 cups, a medium apparatus 103 may hold 3.5 cups and a large apparatus 103 may hold 5 cups. In other embodiments, the apparatuses 103 can be made in any other suitable sizes. An apparatus/plate may have designated areas with different sensors for different kinds of foods like meat, starch or vegetables. There may be one or multiple sensors that differentiate and track.

In an embodiment, the bottom of the apparatus 103 can have features, which allow the apparatus 103 to be securely held in place on the base 105. For example, the bottom of the apparatus 103 can have a recessed cylindrical volume 133 and the top of the base 105 can have a corresponding cylindrical feature 135 that fits within the recessed volume 133 of the apparatus 103. The inner diameter of the recessed cylindrical volume 133 can be slightly larger than the outer diameter of the top cylindrical feature 135 of the base 105. When the apparatus 103 is placed on the base 105, the apparatus 103 will be securely held in place on the base 105. In other embodiments, any other geometric features can be formed on the upper surface of the base 105 and the lower surface of the apparatus 103 to prevent the apparatus 103 from being easily removed from the base 105 by the pet due to horizontal or downward forces.

A load cell(s) 209 can be mounted to an upper surface of the base 105 so that it can be used to weigh the apparatus 103 and the food or water or material held in the apparatus 103 which can be a dispenser, container, cup, bowl, plate, divided plate, divided bowl, drinking glass or other tableware. The load cell (s) 209 can be a strain gauge that measures the deformation (strain) as a change in electrical resistance, which is a measure of the strain and hence the applied forces. A load cell can consist of one or more strain gauges. The electrical signal output of the load cell 209 can be in the order of a few millivolts and can be converted to a digital signal by a digital/analog converter 210 for processing by the processor 201.

The bottom surface of the base 105 can have a sturdy rubberized surface, which provides a high coefficient of friction to prevent the smart apparatus 101 from sliding on a smooth surface. In an embodiment, the apparatus 103 is easily detachable from the base 105 allowing easy cleaning of the apparatus 103.

Various electrical components can be housed within the base 105 including: a processor 201 which can be coupled to various system components including: an input 203, a tactile output, an accelerometer, light sensor, temperature sensor, motion sensor, speaker, horn, sound sensor, piezo element, manual reset capability (button or such), data entry device/screen, scroll wheel, clock, a radio frequency (RF) output 205 like a Wi-Fi module or BLE chip set, cellular or 5G, an audio output 206, memory 207, load cell 209, a battery 211 which can be charged with a charger 213, apparatus sensor 215 and a light output 217 which can be coupled to a light pipe 219. The load cell 209 can be used to measure the weight of the apparatus 103. The input 203 can be a button, which can allow a user to press the button to cause the processor 201 to output information through the light output 217. For example, in an embodiment, the base 105 can be configured to indicate if the pet has been fed when the input 203 button is pressed. The processor 201 can respond to an input button 203 by illuminating the light output 217 in a color that indicates the feeding status. For example, in an embodiment a green light output 217 can indicate that the individual human or animal needs to be fed and a red light output 217 can indicate that the pet has been fed and does not need to be fed at this time. In an embodiment, the light output 217 can be a light emitting diode (LED) that can output multiple colors of light such as: white, yellow, blue red, magenta and green.

In an embodiment, the smart apparatus 101 can be configured to store a diet/feeding/hydration/medication/reminder schedule for the animal or human, which can be stored in (non volatile) memory 207. The stored schedule can be used by the processor 201 to provide feeding or other reminders to the caretakers. At the scheduled feeding times, the processor 201 can transmit feeding signals to the RF output 205 which can transmit feeding, watering or medication reminders to the caretaker. The feeding signals can be text, audio, voice, sound, triggers of other smart home devices like a home hub or other smart appliances/apparatus like refrigerator, dishwasher, stove and/or email messages informing the caretaker to care for, feed, water, give medication, take medication the human or animal. In an embodiment, the processor 201 can illuminate the light output 217 and/or emit an audio signal through an audio output 206 which can be a speaker, buzzer, or other output devices such as a tactile output 204 which can be vibration, buzzer or other mechanical output to remind the caretaker to feed the human or pet. These base 105 controlled outputs can follow the diet or feeding schedule stored in memory even if there is a power outage and wireless communications with the smart apparatus system server and mobile computing device are disrupted. These base 105 controlled outputs and memory 107 can also be updated over RF/cellular network/electric through the cloud system and database.

The caretaker or user can place food in the tableware apparatus 103 and the load cell 209 can monitor the quantity of food being placed in the tableware apparatus 103 based upon the weight detected by the processor 201. As food is placed in the tableware apparatus 103, the load cell 209 can output a signal indicating the increased weight of the food. In an embodiment, the feeding schedule can include a weight of food for each feeding of the day. Food can be placed in the tableware apparatus 103 and the processor 201 can respond to the food placement by illuminating the light output 217 in a color indicating the need for more food. When the proper quantity of food is placed in the apparatus 103, the processor can change the color of the light output 217. For example, when more food is required, the light output 217 can be illuminated in green and when the proper quantity of food has been placed in the apparatus 103, the processor 201 can cause the light output 217 can be changed to red or any other programed light output color indicating the proper food quantity. In an embodiment, the light output 217 can be coupled to a light pipe 219 which can extend partially or fully around the circumference of the base 105 to that caretakers can view the light pipe 219 from any angle relative to the smart apparatus 101.

In another embodiment, the smart apparatus 101 may also include an apparatus sensor 215 which can be used to monitor the food placed in the apparatus. For example, in an embodiment the apparatus sensor 215 can be used to determine if the apparatus contains water, meat, vegetables, starch, carbohydrates for humans or dry pet food or wet pet food for pets. The apparatus sensor 215 can then transmit a signal to the processor 201 indicating that the apparatus 103 contains water or food so that the processor 201 can provide the proper feeding or water filling signals based upon the contents of the tableware apparatus 103.

In an embodiment, the smart tableware apparatus can include bowls, plates, and drinking glasses. The plates can be configured with multiple partitioned zones which can each be designed to hold a different type of food. For example, a large zone for a main food item such as a protein, a medium zone for carbohydrates, and a smaller zone for vegetables. Each of the partitioned zones can have a recessed food containment area, a load cell 209, and apparatus sensor 215. In an embodiment, the system diet software can be configured to indicate the proper portions of the different food groups on a visual display such as a light on the smart tableware apparatus or on a user interface of a mobile computing device display.

In an embodiment, the apparatus sensor 215 can identify the type of food and detect the temperature of the food. Many wet pet foods are preferably served at room temperature since some pets may not like to eat cold food. In an embodiment, the smart apparatus can be configured to notify the caretaker when the wet food is served at a detected temperature below a preset temperature range though an apparatus base output or message to the computing device. The user can then place remove the apparatus and food from the base and microwave the contents for a few seconds. Alternatively, if the food is too hot, the smart apparatus 101 may emit an alarm to communicate to the caretaker to keep the food away from the animal or human until the temperature has dropped to a safe level.

In an embodiment the smart apparatus may have an attachment, or insert, that an animal will lick repeatedly (e.g. because there is a sweetener contained inside) or human will lick repeatedly and that will collect samples of saliva and spittle. From the collected sample a individual's DNA, metabolism/caloric rates can be gathered for further analysis (e.g. mailed to a laboratory, sent digitally to a coach, manager, instructor or delivered/transmitted to a doctors, veterinarian office or caretakers home or phone or computer.) From this information, a human's diet or an animal's ideal nutrient profile can be gathered.

The modular system enables objective measurement previously not possible. Biometrics may be gathered from the modular system which can be collected and then compared to a database of like-kind animals in similar environments, e.g. latitude/longitude, ambient temperature. To gather this data, the system may include Inserts or attachments like a thermal scanner, infrared camera, optical scanner, camera, thermometer/temperature gauge, strain gauge, piezo element, additional load cell, sensors or force plate. Any of these devices can be used to observe, measure and monitor individual changes in behavior, gait, stance as apparatus is approached, held or used. For example for an animal head position, pressure disbursement, whisker twitching, time spent eating, paw print, paw pad temperature, length of toenails/claws to assess their health and wellbeing, muscular strength, orthopedic pain level, stress/anxiety level, comfort or agitation can be gauged. This data will be sent to the cloud database and compared and contrasted to other animals with comparable characteristics to predict or diagnose health or behavioral issues. The modular system therefore provides a minimally invasive means for gathering data and samples to establish a highly personalized log of the animals day to day characteristics, behavior, biorhythm, benchmarks and norms. Comparing this data to other animals will be used for predictive modeling of early warning signs and to diagnose health problems earlier than a human might have been able to observe them. Early diagnosis is a key factor in the success rate of preventing disease, and the system will be acting as an early warning system to help head off problems early.

The smart apparatus 101 may also determine how long the food has been in the apparatus. If the food has been in the apparatus for longer than a predetermined time period, the smart apparatus 101 can indicate that the food may not be suitable for pet consumption and should be thrown out via a apparatus base text or light output or message to the computing device. Some types of wet food may go bad more quickly in hot temperatures. The smart apparatus 101 can monitor the temperature of the food and time exposure to the heat. The smart apparatus 101 can then indicate when the wet food should be thrown out.

In an embodiment, the apparatus sensor 215 may include a temperature sensor that may be able to detect a temperature of a pet. In an embodiment, the apparatus sensor 215 may include a temperature sensor can be a thermometer or other temperature sensing device such as an infrared optical temperature sensor. Because the pet will be eating, the temperature sensor may have direct access to the interior of the pet's mouth, which may result in a more accurate body temperature measurement. The smart apparatus 101 may store the normal body temperature of the pet. If there is a deviation from the normal body temperature, the smart apparatus 101 may transmit a message to the caretaker's computing device indicating that the pet has an elevated body temperature, which may indicate that the pet is sick and should be taken to a veterinarian for a check up.

In some embodiments, the smart apparatus sensor 215 can include particle sensors which can detect problems with the food and/or water including: allergens, bacteria, parasites, insect or rodent infestation, contaminants, etc. When problematic materials are detected, the smart apparatus 101 can then indicate when the wet food should be thrown out with apparatus base alarms and/or messages to the caretaker computing devices. In other embodiments, the apparatus sensor 215 can detect other physical characteristics of the apparatus contents. For example, the apparatus sensor 215 can include a pH level sensor that can provide a record of the user's pH level of the water within the apparatus 103.

Some caretakers use drinking water additives, which can be formulated to help freshen your pet's breath and maintain oral hygiene in conjunction with regular home dental care for the pet. In some cases, adding too much of the water additive can alter the pH level of the water. A normal neutral pH level of about 7 is important for the growth of healthy bacteria. However, a pH level that is more acidic will cause the healthy bacteria to be replaced with unhealthy bacteria that can cause tooth decay. The pH level apparatus sensor 215 can determine if the pH level in the apparatus 103 and the pH level signal can be transmitted to the processor 201 which can emit a warning signal when the pH level drops below 5.5. If the pH level is outside of an acceptable range, the processor 201 can output a warning signal to the light output 217 and/or the RF output 205. The caretaker can respond by disposing of the water and replacing it with fresh water.

The components of the base 105 can be powered by one or more batteries 211. For example, in an embodiment, the batteries 211 can include four AA size batteries, which are mounted in a battery holder in the base 105. The batteries 211 can be coupled to a charger 213 which can keep the batteries 211 charged. The charger can be an alternating current (AC) adapter, which provides direct current (DC) electrical power to charge the batteries 211. In another embodiment, the charger 213 can be a universal serial buss (USB) connector or a solar panel, which converts light into DC electrical power to charge the batteries 211. The solar panel can provide electrical power to the batteries 211 during the day and the stored power in the batteries can power the smart apparatus 101 at night when the solar panel is not producing electrical power.

Figure 4:
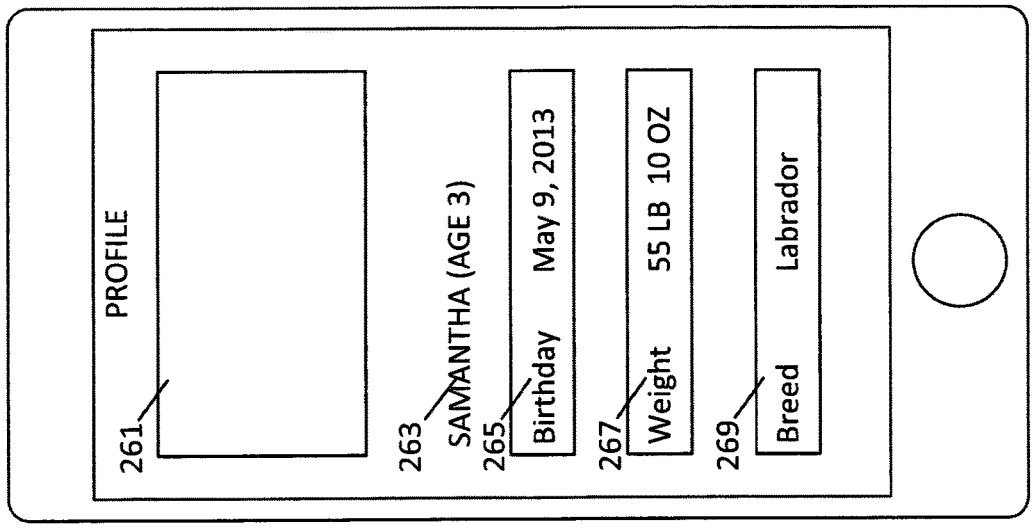
FIG. 4 illustrates an embodiment of a user interface on a computing device displaying the human or animal's information.
Figure 3:
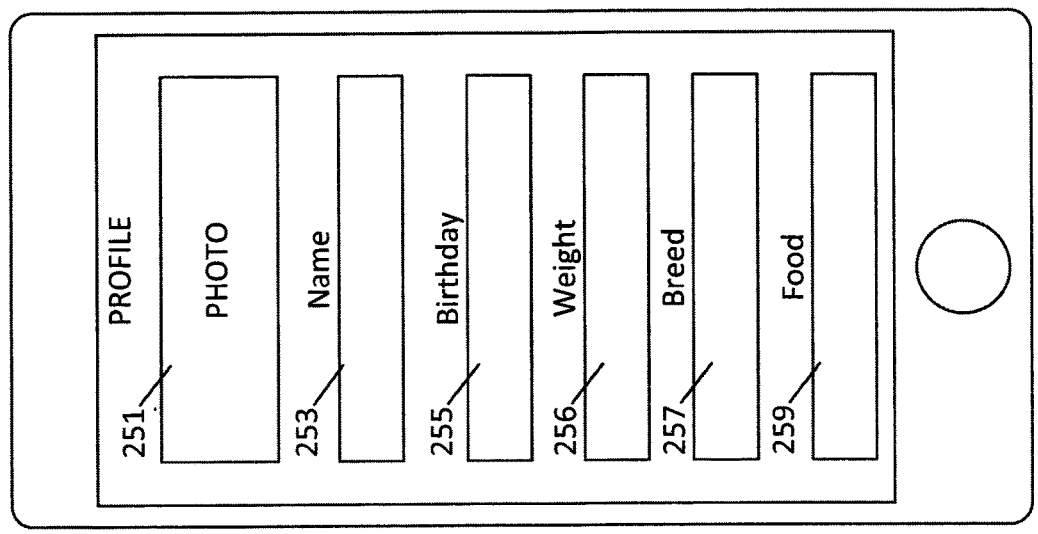
FIG. 3 illustrates an embodiment of a user interface on a computing device for inputting an individual human or animal's information.

When a caretaker uses a smart apparatus 101, the system can be configured so that the apparatus(s) 101 can communicate with the server 111 and the mobile computing devices 107 as illustrated in FIG. 1. The process can include inputting information for the pet through the mobile computing device 107. With reference to FIG. 3, a mobile computing device is illustrated with a user interface for inputting pet profile information. In this embodiment, a user can input a photo of the pet in the photo input 251, the name of the pet in the name input 253, the birthday in the birthday input 255, the weight of the pet in the weight input 256, the breed in the breed input 257 and the food that will be used with the smart apparatus in the food input 259. With reference to FIG. 4, once the pet or human data is input the user interface of the computing device can display the photo 261, the name of the pet or human with the age 263, the weight of the pet or human 267 and the breed of the pet 269.

Figure 5:
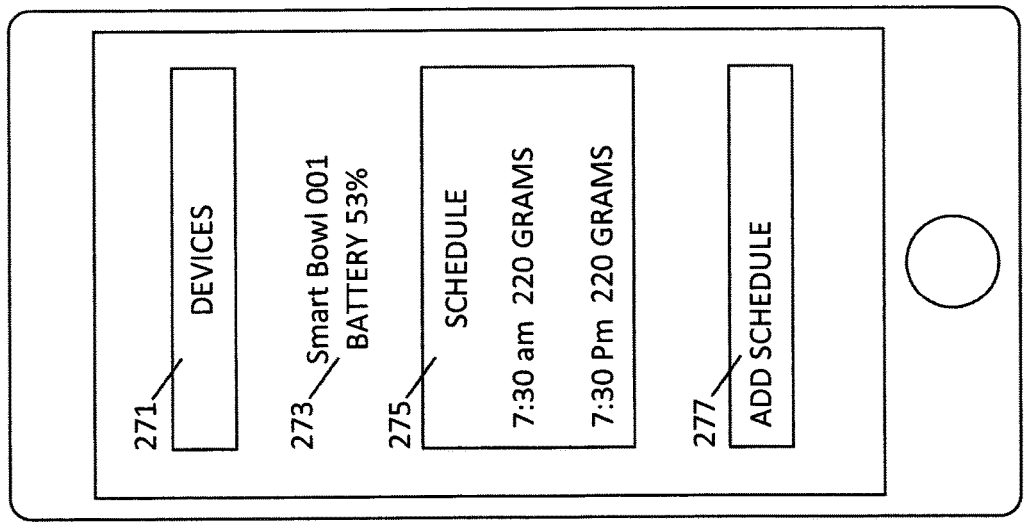
FIG. 5 illustrates an embodiment of a user interface on a computing device for inputting the human or animal's feeding, meal time, medication or hydration scheduling information.

As discussed with reference to FIG. 2, the smart apparatus can include a processor, which is coupled to a battery and an RF module and transmitter. The smart apparatus system can be configured with a feeding schedule that can be stored in memory on the pet apparatus, the computing device and/or the server and updated by any one of the other devices like a phone or push notification. With reference to FIG. 5, the processor of the apparatus can determine the charge level of the battery and transmit this information to the mobile computing device, which can display the battery charge information. In this example, the user interface is displaying a charge level of 53% for Smart apparatus 001 273. If the battery runs low, the user interface can remind the user to charge the battery. The user can click on the "Devices" button 271 to select any other smart apparatuses in the user's smart apparatus network. The feeding schedule for Smart apparatus 001 can be input through the user interface by clicking on the Add Schedule button 277 and then typing in the feeding time and the quantity of food to be fed to the pet. In this example, the user has input a first feeding at 7:30 AM of 220 grams of pet food and a second feeding at 7:30 PM of 220 grams of pet food.

Figure 6:
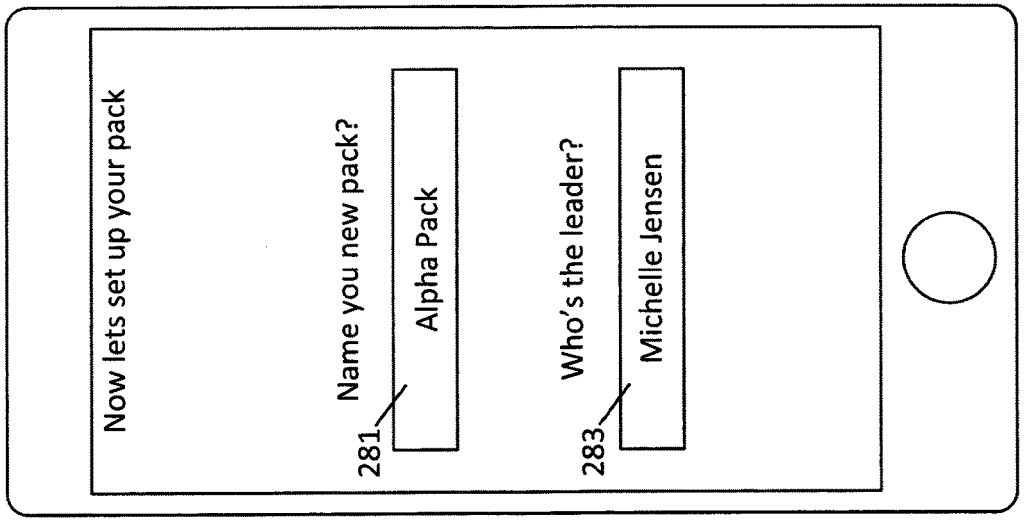
FIG. 6 illustrates an embodiment of a user interface on a computing device for inputting human or pet social network groups like caretakers, team members, teachers, coaches or family members.
Figure 7:
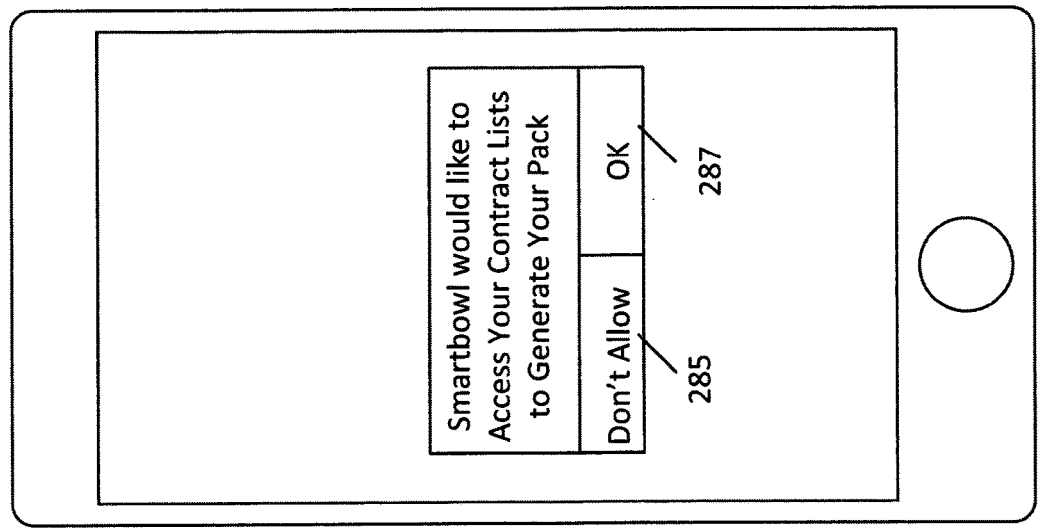
FIG. 7 illustrates an embodiment of a pop-up message on a user interface asking for contact list access authorization.

The smart apparatus system can also be used with pet and/or human social networks. With reference to FIG. 6, the user interface can allow the users to setup a social network "pack." The user can name the pack in the pack name input 281. In this example, the user has input "Alpha pack". The user can then input the leader of the pack in the leader input 283. In this example, the user has input the leader name, Michelle Jensen. With reference to FIG. 7, in an embodiment, the user interface can request access to the user's contact list. The user can click on the "OK" button 287 to allow the system to access the user's contact list on the user's mobile computing device or click the "Don't Allow" button 285 to prevent the system from accessing the contact list.

Figure 8:
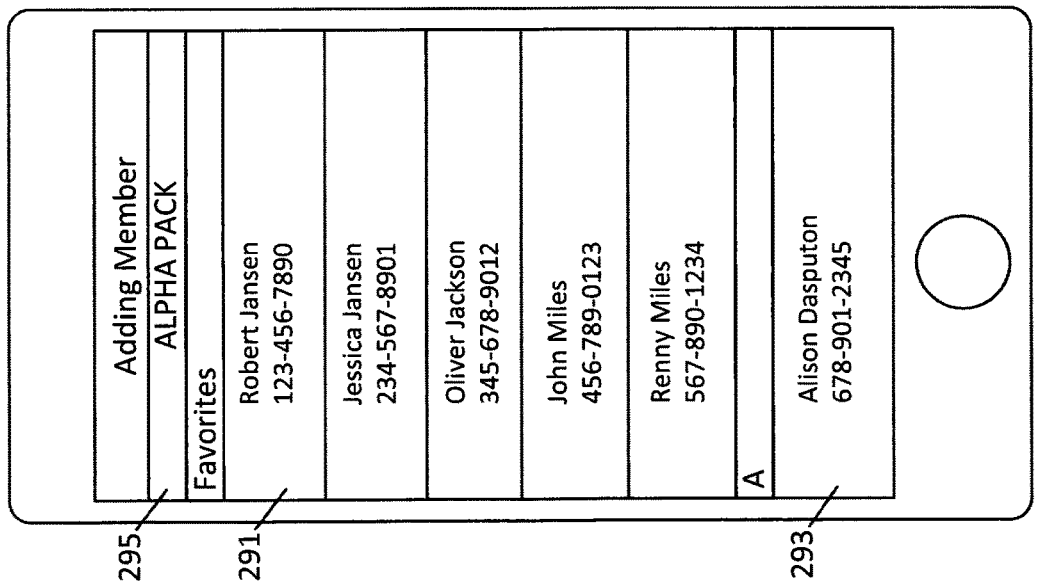
FIG. 8 illustrates an embodiment of a user's contact list on a user interface.
Figure 9:
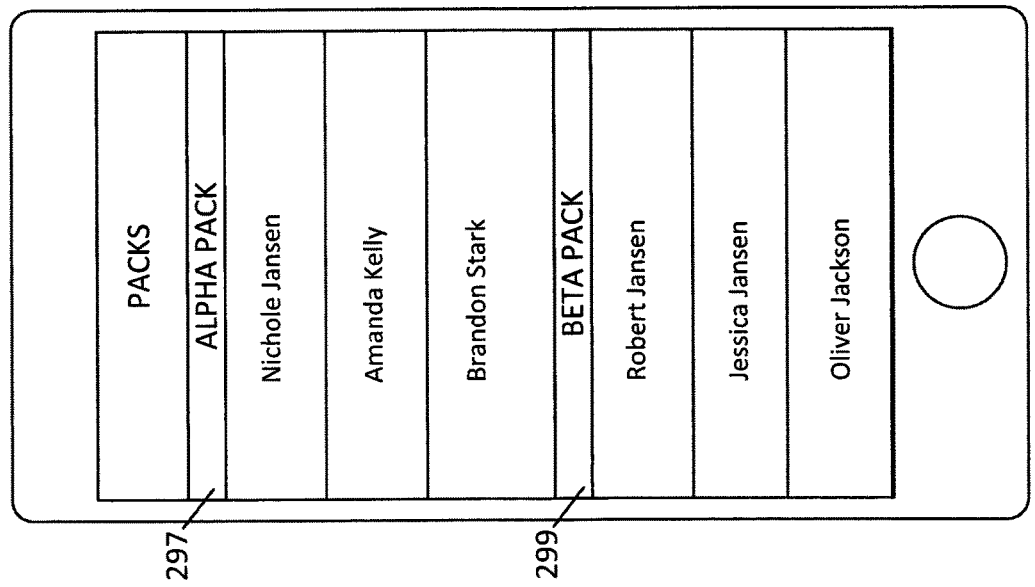
FIG. 9 illustrates an embodiment of social network group listings on a user interface.

If the user allows access to the contact list, the user interface can display the user's contact list, which can be added to a selected pack. With reference to FIG. 8, the user can select a desired pack in the pack select button 295. In this example, the user is selecting members for "Alpha Pack". In this example, the user's contact list can include favorites from the contact list 291 which can include the names of contacts that are most often contacted by the user. The favorite contacts 291 can be listed first. The user interface can then display the remaining contacts in alphabetical order or order of contact priority. The pack becomes a 'responsibility ladder' communicating to the person in charge of the animal and the rest of the group. Should one person fail to administer care, like refill the water dish, the next person in the responsibility ladder will be communicated with by phone, text, email or other method. In the illustrated example, the "A" names are listed 293 below the favorites 291. The user can swipe the list up or down to move through the list of contacts. The user can click on the names in the contacts list to add the members to the user's pack. With reference to FIG. 9, once the user's pack members have been input, the user interface can display the members of the user's packs. In this example, the Packs page of the user interface displays both Alpha Pack 297 and Beta Pack 299 members. The user can swipe up or down over the Alpha Pack and Beta Pack members to scroll through the members.

In an embodiment, a pet's pack can be a group of caretakers assigned to the same pet or the same apparatus and the pack can be set up through the contacts list on the smart phone computing device. The pet's pack can correspond to the phone tree/communication ladder/hierarchy for any given pet. An 'alpha' can be a primary caretaker(s), main owner, key person who wants the most information about the dog. The system can be configured for auto-messaging to the 'alpha' when tasks are completed. The rest of the caretakers can be "beta" pack members. The other caretakers may perform one or more caretaker functions as designated by the caretaker privileges defined by the 'alpha' caretaker. The order, in which their contact information is set up, sets the rules for them being reminded or designated as the caretaker based on status, and optionally the caretaker privileges assigned to them. For an alternate caretaker, the apparatus reminds him that it is time to feed the dog and signals when the right amount of food has been put in the apparatus. For example, the base light may be green when food is needed and as the food is placed in the apparatus the light can turn red to signal stop filling. For primary caretakers, a button on the base of the apparatus can be pressed to interrogate the apparatus. The smart apparatus can respond by emitting signals indicating if the pet has or has not been fed according to the stored feeding schedule. If the caretaker status is away, the smart apparatus system can transmit notifications to alternate caretaker(s) who can be: kennel, dog walker, teen pet sitter, etc. Because these care takers may not live in the pet's residence, the Feeding schedule reminders can be within time range of pre-set or learned schedule. The messages sent by the server to the secondary caretakers may include feeding instructions which can include food amount, stop filling signals emitted by the apparatus, keep filling signals emitted by the apparatus, and change water.

In an embodiment the smart apparatus can have adaptive priorities. The smart apparatus and app alert caretaker based on learned or pre-set schedule, personal preferences or push notifications in the case of emergency. Default will be reminders are given a predefined amount of time (e.g., 2 hours) prior to meal time when in away mode. The predefined amount of time can be input through the reminder preferences. In different embodiments, the server can transmit multiple reminders to the same or different caretaker if a specified action has not been taken within a specified interval of a prior reminder. For example a first reminder can be transmitted if a caretaker has not taken an instructed action like changed the water or feed the dog within a predefined amount of time, for example 60 minutes. This predetermined time can be a default setting or customizable as a user preference setting. If action is not performed and detected by the smart apparatus, the caretakers cam be reminded again either by text, within the app running on the mobile computing device or other communication preferences such as email or phone call. In an embodiment a second reminder can be configured if a pet has not been fed 30 minutes (or any other set reminder time) after the first reminder.

If the first caretaker is not responsive to the first and second reminders, the smart apparatus system can contact the next designated caretaker. In an embodiment, the caretakers can be ranked in a hierarchy list of caretakers. The smart apparatus system can transmit a message to the next caretaker indicating that the first caretaker was not responsive and requesting the second caretaker to perform the pet feeding. The feeding reminder process can then be repeated and if a secondary caretaker fails to perform a predefined action within a specified interval of time of providing a given reminder, for example feeding the pet within 30 minutes of a given reminder the smart apparatus system can provide a subsequent reminder to the next caretaker. The smart apparatus system can continue following communication ladder based on rules set up by the system user for the pet. All actions and messages transmitted between the smart apparatus system and the caretakers are tracked within the application on the computing device and in the cloud by the server.

In an embodiment, the user may wish to travel with the smart apparatus and the smart apparatus system can have location based rules to change the operation based upon location. The user may also have more than one apparatus, but have his phone accompany him so that changes in position can be assessed/attributed using geo-fencing, altitude, latitude and longitude coordinates or time zone for example. In an embodiment, the location of the smart apparatus can be determined by the Wi-Fi IP address being used by the smart apparatus. When the smart apparatus is moved to a new location the smart apparatus can connect to the new location's Wi-Fi network to communicate with the smart apparatus's server. In an embodiment, the smart apparatus can be configured with different sets of rules defined for different location coordinates of the apparatus.

Figure 23:
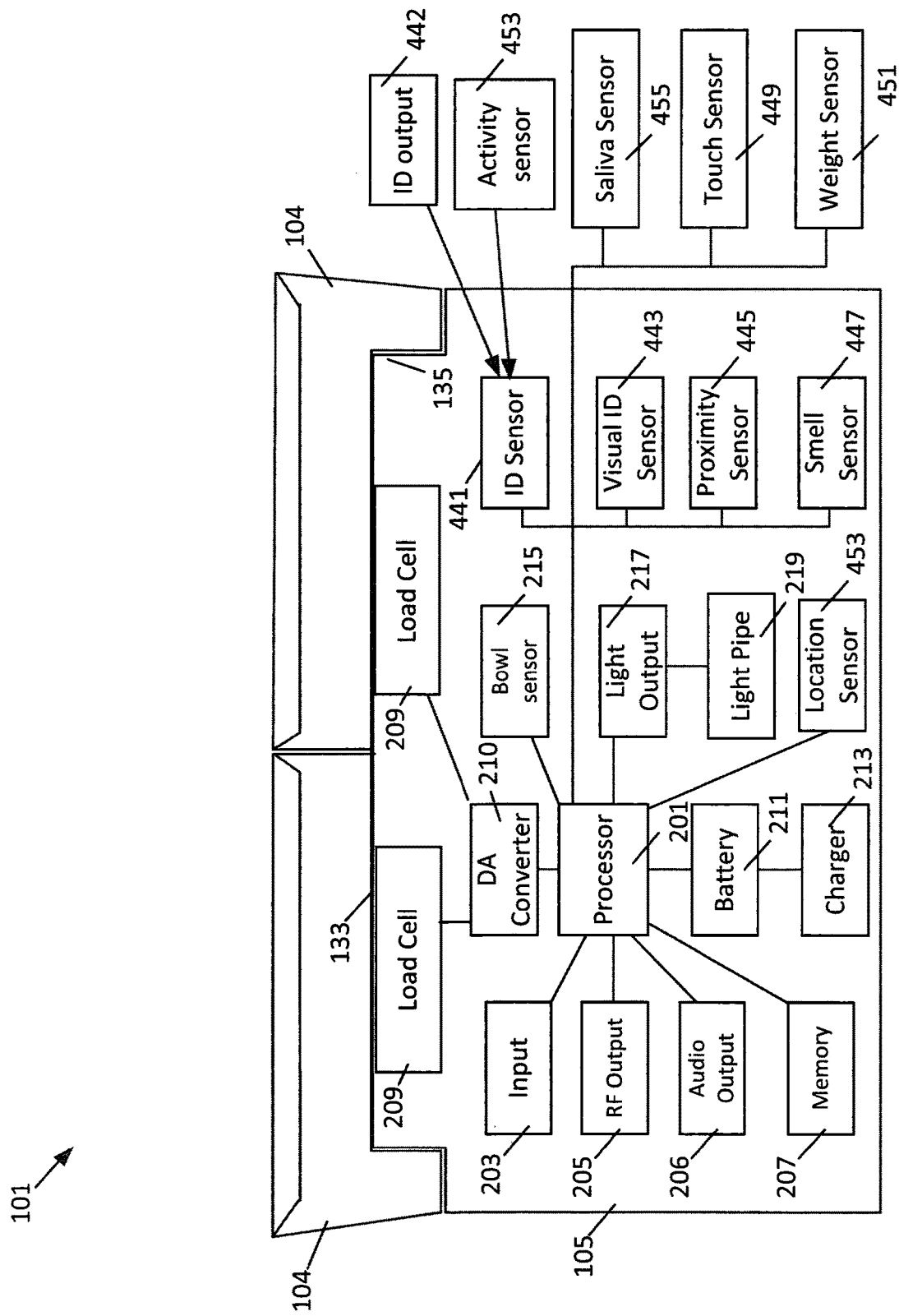
FIG. 23 illustrates a block diagram of an embodiment of a smart apparatus.

With reference to FIG. 23, the smart apparatus 101 can be a plate with multiple food areas 104 which can each be used for a different type of food. In different embodiments, the smart apparatus 101 can have any number of food areas 104 which can be designed for different types of food groups including: vegetables, starches, proteins, etc. In this embodiment, each of the food areas 104 can be mounted over a different load cell 209 so that each type of food can be individually weighed. The memory 207 can store different caloric values for each food group. The system can coordinate the feedings of each food group on the smart apparatus 101 so that the individual food group feedings and the combined feedings of the food groups can have a cumulative specific caloric value or nutritional value.

Figure 28:
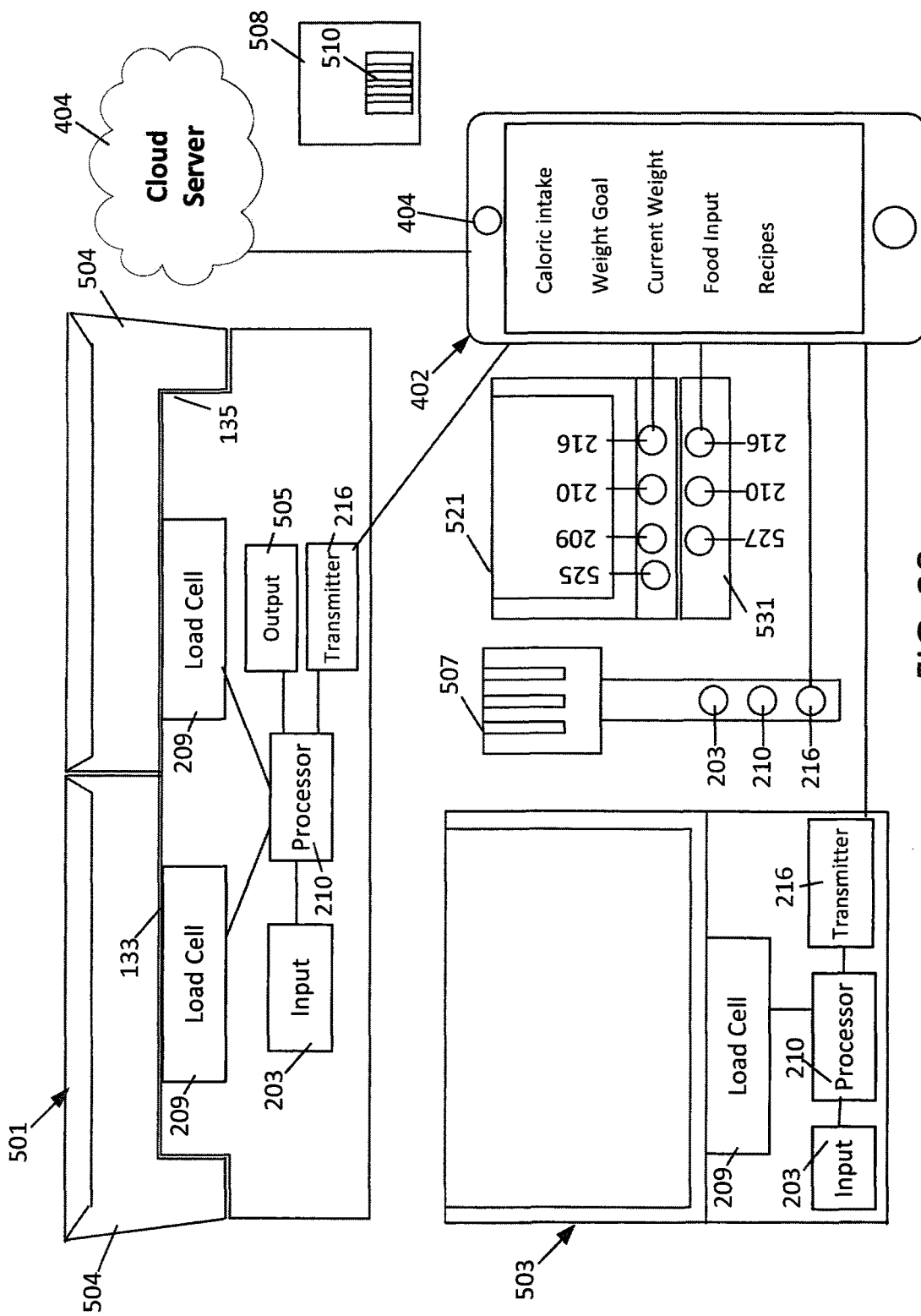
FIG. 28 illustrates a block diagram of an embodiment of a smart apparatus system.

With reference to FIG. 28, in other embodiments multiple smart apparatus can be used in combination with a computing device 402 such as a smart phone which can communicate with cloud base servers 404 which can provide software updates and receive information from a plurality of mobile computing devices 402. The cloud base servers 404 can have storage devices which can record data from multiple users. This information can be used to make adjustments to diet plans based upon user efficacy.

In the illustrated example, the smart apparatuses can include a plate 501 with multiple food areas 504 which are each mounted over a load cell 209. The load cells 209 can be coupled to a processor 210 which can detect the weights of the different food areas 504. The processor 210 can transmit the weight information to the transmitter 216 which can transmit the food area weight information to the computing device 402 which can be a smart phone. The system may also include a smart drinking glass apparatus 503 which can also have a load cell 209 coupled to a processor 210 and a transmitter 216. The weight information from the plate 501 and the drinking glass apparatus 503 to the computing device 402 which can perform the feeding and nutritional computations to control the recommended feedings for the system user. The smart apparatus plate 501 and the smart drinking glass apparatus 503 can have inputs 203 which can provide a user input or a control. For example, the input 203 can be a zero button which can provide a reset for the load cell 209.

In another embodiment, the smart apparatus, bowl or plate 501 can have multiple food areas 504 that are each predefined and configured for certain kinds of foods. One area could be for protein, one for vegetables or fruit and another for starch. The areas may be configured and personalized based on the serving size the person should eat and then track whether they are overeating, getting enough of the right kinds of vitamins etc. The food areas may be color coded (or otherwise labeled or marked with text) and sized for the appropriate portions of each type of food. For example, a green food area 504 may indicate vegetables, a purple area may indicate fruits, a red area may indicate proteins, a yellow area may indicate carbohydrates, a blue area may indicate healthy fats, and an orange area may designate seeds or dressings. While the plate 501 is illustrated as a single structure, in other embodiments, the tableware plate 501 can be several separate structures that can have different sizes and may all communicate with the same mobile computing device 402. By weight and volume, the fruit and vegetable food areas 504 can be larger than the protein food area 504 which is larger than the carbohydrates area 504 which is larger than the heathy fats area 504 which is larger than the seeds or dressings area 504.

In other embodiments, it can be important to know and input the caloric and nutritional values of the food items placed in the food areas 504 of the smart food and/or beverage tableware 501 having multiple areas 504 such as the device illustrated in FIG. 28. In an embodiment, the different foods for consumption can come in their own packaging and may not have the smart sensor to measure/weigh the contents in the packaging, a smart container is needed as part of this system. This enables anyone to consume any product they may like but also measure and manage that intake. For example, potato chips may always come in puffed up plastic bags as a means for their best delivery. With a smart container, the consumer may pour the bag of chips into the container (with a lid or not) and measure each bite, snack or handful taken out of the container. This allows flexibility in a diet and adds the capability to track the entire pantry in a home, restaurant or office.

In some embodiments, the mobile computing device can have a sensor 404 which can be a camera, a barcode reader, an RFID reader, or other kind of sensor. The food or beverage can be in a container 508 that has an information or identification mechanism 510 that can be read by the sensor 404. The information or identification mechanism 510 can be tag or marking such as a barcode or RFID. The food or beverage information on the information or identification mechanism 510 can be a code(s) that can include or be associated with caloric and nutritional contents of the container which can be interpreted from the information or identification mechanism 510 or stored on a look up table in a database. The mobile computing device 402 may be used to translate the caloric and nutritional contents of the container to the database or app.

In an embodiment, the container 508 may be reused for multiple types of packaged food or even raw ingredients like flour or salt. Because the weight is measured from the beginning to end of the use of the product, this container 508 may also re-order/auto-replenish what was stored in the container so that you won't run out of your favorite snack or necessary staple. Other examples of smart containers 508 can be product specific. For example, a smart beer can container 508 could have the sensor built into it to automatically log what is consumed by unit (in this case) rather than just weight. When the beer is placed near the mobile computing device 402, the caloric contents and diet log will be updated. A person can therefore easily track what she has consumed and the diet regimen could be adjusted accordingly to take into account that drink consumed out of the can container 508. Other examples of smart containers 508 can include smart milk cartons, smart soda bottles, smart bread baskets, etc.

In an embodiment, the smart liquid storage containers 508 can be used with smart tableware drinking containers 503 which can be a glass or cup can also to be part of the system to obtain beverage data regarding what a person consumes. This information can be used to manage the user's diet and nutrition. After the smart liquid storage containers 508 is removed from a refrigerator, the sensor 404 on the mobile computing device 402 can read the identification mechanism 510 which can be a barcode or RFID or BLE mechanism on the beverage container. The beverage can be poured into the smart beverage container 503 and the weight of the poured liquid can be detected by the load cell 209. As the user consumes the beverage, the user's beverage consumption can be transmitted to the mobile computing device 402 and the user's beverage consumption history can be stored and tracked. This beverage consumption tracking can be useful for homemade items and gives the system additional flexibility to track human consumption no matter what the liquid is.

Another embodiment includes smart silverware 507 that can include sensors and RF transmitter that communicates and works with the mobile computing device 402 of system. It can track who is eating based on biometrics such as finger prints, facial recognition, or saliva for example. A device such as the computing device 402 or the silverware 507 can have a finger print reader to identify the system user. Alternatively, the computing device 402 or the silverware 507 can have a camera which can be used to store user image data and to verify the identity the system user. The silverware 507 may include a saliva sensor which can identify the user based upon markers in the saliva such as DNA. The smart silverware 507 can also include movement sensors such as accelerometers and gyroscopes which can tracks eating movements of the user. This movement sensor data can be used to indicate how quickly a person eats, what portion sizes they have on their fork or spoon silverware 507 and other habits that impact health, weight gain or loss.

In addition, smart cookware 521 like a pot or pan can also have integrated load cells 209, thermometer 525, and a transmitter 216. The integrated load cells 209 can be used to weigh the food that is placed in the smart cookware 521 and the thermometer 525 can be used detect the actual cooking temperature in real time. The weight and temperature information can be transmitted to the mobile computing device 402 so the smart cookware 521 can work with the mobile computing device 402 to intelligently assist a user in preparing a dish. In an embodiment, the mobile computing device 402 can communicate with both the cookware 521 and control a heat output 527 or a cooktop 531. Thus, the mobile computing device 402 can both control the heat output 527 from the cooktop 531 and detect the heat of the smart cookware 521 so that if the temperature detected by the thermometer 525 in the smart cookware 521 is above the required cooking temperature, the mobile computing device 402 can reduce the heat output 527 or if the if the temperature detected by the thermometer 525 in the smart cookware 521 is below the required cooking temperature, the mobile computing device 402 can increase the heat output 527 for precise temperature control. Similarly, the mobile computing device 402 can monitor the cooking time duration from when ingredients are placed in the preheated smart cookware 521. The system can reduce or cut off the heat output 527 when the cooking time duration has elapsed.

In an embodiment, a specific recipe can be selected through the user interface of the mobile computing device 402 and the recipe can be adjusted based upon the people who are going to consume the meal, the diets and the activity levels of these people. Based upon the caloric and nutritional requirements of the meal, the system can determine the quantities (volumes or weights) of ingredients to make the meal. The recipe may first call for preheating the smart cookware 521. The user can gather the ingredients and confirm that they are ready to begin cooking.

The mobile computing device 402 can instruct the user to place the smart cookware 521 on the cooktop 531 and the mobile computing device 402 can control the cooktop 531 to provide the proper heating to the smart cookware 521. The smart cookware 521 reaches the proper preheat temperature, the can transmit temperature data to the mobile computing device 402 and when the mobile computing device 402 can instruct the user to place certain food ingredients into the smart cookware 521 such as a meat. The mobile computing device 402 can instruct the user to brown both sides of the meat and the mobile computing device 402 can instruct the user when the meat should be turned. The mobile computing device 402 can then recommend adding vegetables to the smart cookware 521 and later broth. The smart cookware 521 can transmit weight information to the mobile computing device 402 which can inform the user if too much or too little vegetables or broth has been added. The mobile computing device 402 can also control the cooktop 531 to properly control the cooking temperature throughout the different cooking steps. In an embodiment, the mobile computing device 402 can also recommend when to add specific quantities of ingredients such as spice(s) to the smart cookware 521 based upon the personal preferences of the system user. Because the smart cookware 521 and mobile computing device 402 and possibly the cooktop 531 all work together, it is possible to precisely control the quantity and seasoning of food being prepared for a user who is attempting to control their food consumption. The inventive system can be used to prevent excess food preparation which can result in over eating.

In another embodiment, user sensors such as: a fitness tracker, heart monitor, sweat sensor, or other smart sensor works can communicate with the mobile computing device 402 and be used with the inventive system. These sensors can indicate physical activity and adjust the user's caloric intake immediately after physical activity. After physical activity detected by the user sensors, the mobile computing device 402 can instruct the user to consume carbohydrates, proteins, and some fats after exercising help to encourage muscle protein production, and promote recovery. For example, the mobile computing device 402 can instruct the user to eat a snack as soon as possible after a workout and replace fluids and electrolytes by drinking water before, during, and after exercise. In an embodiment, the quantities of the snacks and beverages can be placed in the tableware 501 and the drinking glass 503 so that the nutritional information can be forwarded to the mobile computing device 420.

In other embodiments with reference to FIG. 23, the location of the pet apparatus 101 can be measured with a location sensor 453 which can be a GPS or other location tracking sensor on the apparatus 101. In an embodiment, the smart apparatus may implement geo-fence or GPS detection of location/rules based status. For example, the smart apparatus 101 may determine that the location is at home based on the location sensor 453 output. Alternatively, the smart apparatus 101 may determine that the location is away from home and apply other operating rules depending upon the detected location.

Different smart apparatus operating rules may be applied at each of multiple different predefined locations such as at: pet kennel, dog park, with Grandma, etc. based on the apparatuses location or most likely the owner's location as indicated by a smart device that accompanies him—like a smart phone, fitness tracker, tablet or computer. Each of these locations may have different messaging settings so that the feeding reminders and feeding instructions are sent to the proper location caretaker(s). This communication can be via apparatus, smart apparatus app, text and/or email messages to the designated caretaker's smart phone computing device.

The social network is not only derived from the location of the apparatus, but it is also derived from the behaviors of pack members and the associated devices that they have with them. For example, if the Pack leader's phone (with the smart apparatus app on it) senses that the primary caretaker is no longer with the dog (like at altitude on a plan for an extended period of time), it can automatically designate alternate caretakers and their associated instructions, rules and communication preferences. Another example would be if a smart thermostat or smoke alarm, like a Nest, sensed that the family was gone but the dog remained at home. The Apparatus could emit emergency signals or trigger alerts to neighbors if the smoke alarm is triggered, enabling rescuers to know that there was an animal inside that needed to be rescued.

If the smart apparatus system and app detects that the location is 'home', it can use the default settings for 'Home' and the system may not proactively remind the 'alpha' pack caretakers but logs all events and activity and communicates based on the 'alpha' pack's preferences. Other status rules can be defined by the smart apparatus system user and the defined rules can trigger subsequent apparatus and app communication. For example, if the smart apparatus system and app detects that the apparatus is at Grandma's house, the reminders can be emitted with sound or rapid blinking ever 30 seconds instead of every minute as this might be more effectively responded to by the caretaker at this location.

In different embodiments, the classifications of the smart apparatus rules can include local notifications and/or alerts provided via the smart apparatus/base. The notifications or alerts can be visual via lights and/or text, audio outputs such as musical or speech messages, tactile, any combination thereof may be communicated locally via the apparatus to communicate with a local caretaker. Examples of such local alerts include: visual alerts provided via LED/LCD displays or other visual indicators. For example, LED color-based notification, LED brightness-based indication, duration of LED on period, periodicity of blinking of LED, message written on an LCD display on the apparatus or base, etc. The audio outputs can be: audio musical, tonal, or speech alerts provided through a speaker provided on the apparatus or base. The tactile alerts can be mechanical vibration signals provided through a buzzer or other mechanical actuator. In some embodiments, different alert conditions may trigger different forms of notification locally from the apparatus. For example, first reminders or less urgent notifications may include/trigger visual notifications; second reminders or moderately urgent notifications may include/trigger tactile notifications; higher order (third or higher) reminders or high urgency notifications may include/trigger audio notifications. The properties of visual, tactile and/or audio notifications may also depend on the nature of alert condition. For example, the periodicity, intensity, repetition rate, content, etc. may vary based on urgency of notification.

Some examples of visual local notifications and corresponding alert conditions can include: high intensity flashes of red light for urgent situations. In contrast, scheduled reminder notifications can be a green light emitted in 10 second durations over several minute until the feeding of food and/or water are addressed and detected by the smart apparatus(es).

As discussed, the light output can be used to indicate when the proper amount of food is placed in the smart apparatus. The smart apparatus can determine that food needs to be put in the smart apparatus and the processor can cause the light output to illuminate green. The base light output can remain green as the food or water is placed in the smart apparatus. When the proper amount of food has been placed in the apparatus, the light output color can change to red. For example, the stop visual signal can be a solid red light for 10 seconds or any other set time period.

In order to only measure the food being placed in and removed from the smart apparatus, the processor can go through a tare process so that the weight of the apparatus is not weighed. This can be selected through an input on the base or through the mobile computing device. The base can display a solid white light for 5 seconds then blink white twice. The empty apparatus can then be placed on the base and this weight measurement can be set to a zero weight value before food is placed in the apparatus.

In some cases, the smart apparatus output notifications may be provided in response to a request for status from the human user. The human user may interrogate the apparatus by way of a touch input, speech input, or any other suitable input and responsive to the human interrogation, the apparatus may provide appropriate status information. Some examples of status information output from the apparatus base provided in response to human interrogation (e.g., press button on apparatus or base to inquire about apparatus status) can include the status and light outputs listed in table 1 below.

TABLE 1

| Apparatus Contents | Status | Light Output |
| --- | --- | --- |
| Food | Pet has been fed | solid red light for 5 secs. |
| Food | Pet needs to be fed | solid green light for 5 secs. |
| Water | Water level is good | solid red light for 5 secs. |
| Water | Change/add water | solid green light for 5 secs. |

Figure 10:
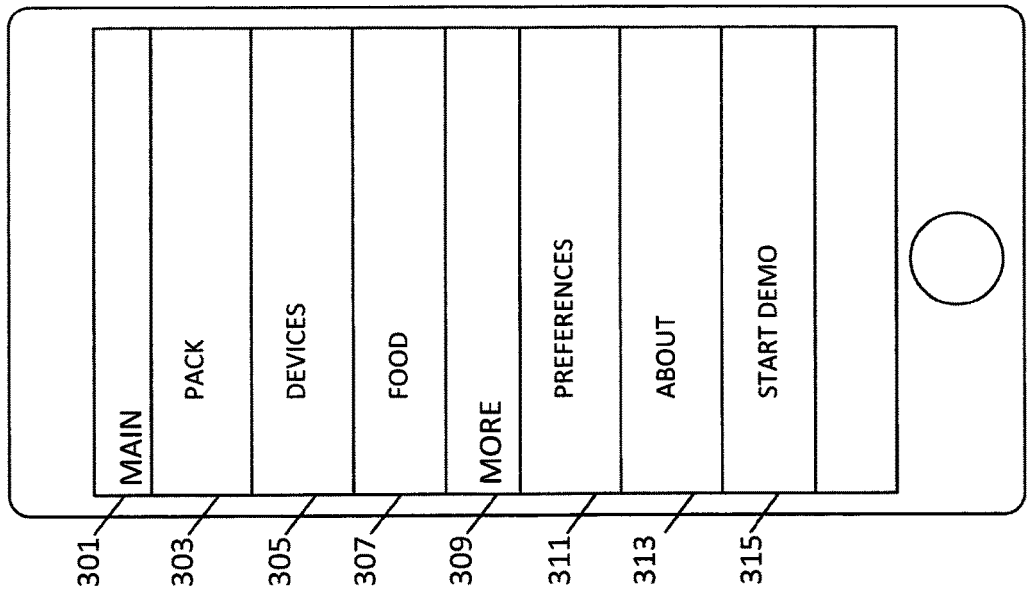
FIG. 10 illustrates an embodiment of a user interface menu.

Once the smart apparatus system has been configured and the basic information for feeding and pack members has been input by the user, the system can allow access to various system features through a menu page. An embodiment of a menu page is illustrated in FIG. 10. In the illustrated embodiment, menu has been divided into a main section 301 and a more section 309. From the menu section 301, the user can access the pack page by clicking on the pack button 303, the devices page by clicking on the devices page 305 and the food page by clicking on the food page 307. From the more section 309, the user can click on the preferences button 311 to access the system preferences, the user can click on the about button 313 to access information about the smart apparatus system and the user can click on the start demo button 315 to play a demo of the smart apparatus system. In an embodiment, the demo can include instructions and/or tutorials for using the smart apparatus system.

Figure 11:
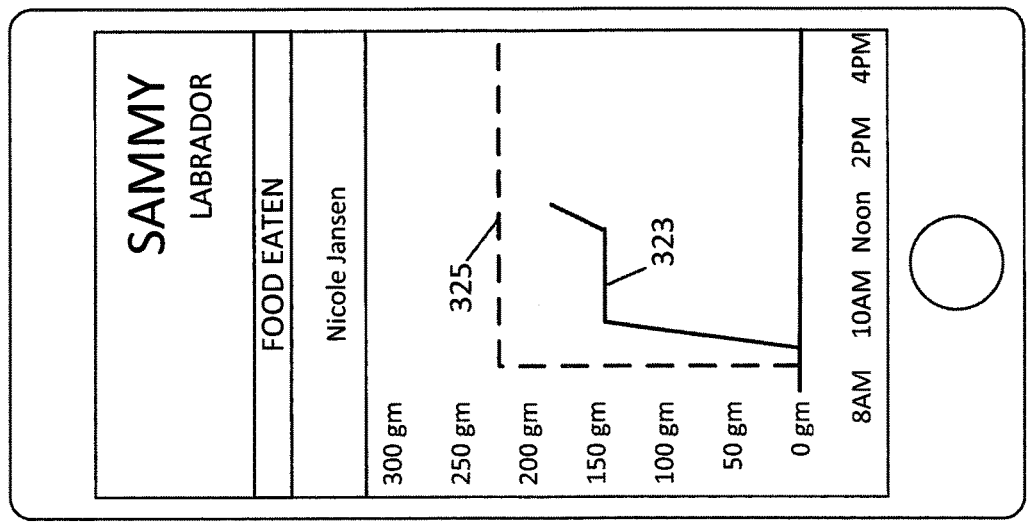
FIG. 11 illustrates an embodiment of an individuals real time food eating graph displayed on a user interface.

In an embodiment with reference to FIG. 11, the smart apparatus system can display a graph representing the pet food consumed by the pet or human over time. The user interface can display the name of the pet and a graph representing the weight of the food consumed in a vertical axis and time in the horizontal axis. The graph line 323 can show the change of weight of the food in the apparatus over time. In this example, the pet can start consuming food at about 9 AM and consumes about 150 grams of food. At about 9:30 AM, the pet can stop eating until about noon. In an embodiment, end of the graph line 323 can represent the current time, which can be about 12:30 in this example. As time elapses, the illustrated graph can scroll so that the current time remains within the viewable area of the graph.

In an embodiment, the graph can include a second line 325 that represents the total food placed in the apparatus. In the illustrated embodiment, 220 grams of food can be placed in the smart apparatus at about 8:30 AM. Thus, the line 325 can be 0 grams prior to 8:30 AM and the rise to 220 grams at 8:30 AM.

Figure 12:
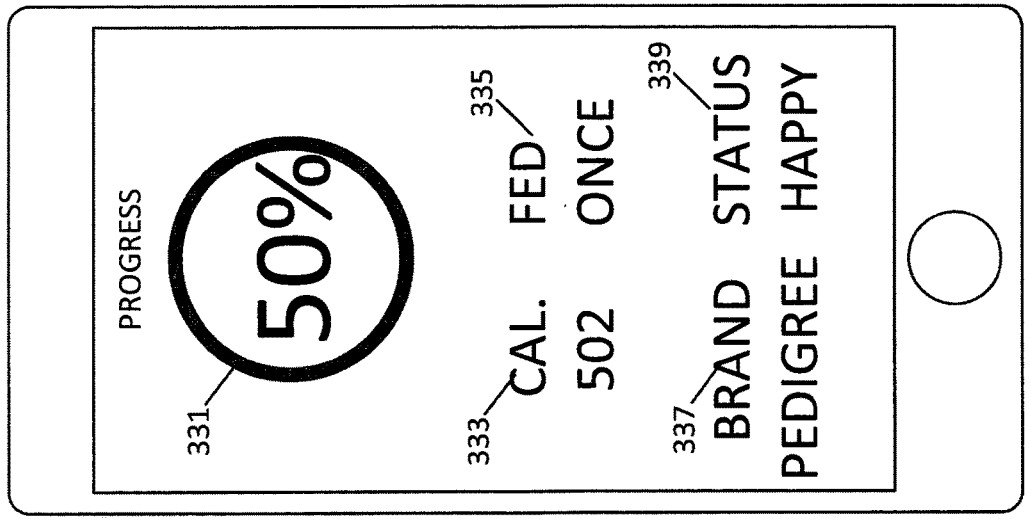
FIG. 12 illustrates an embodiment of an individuals food eating information displayed on a user interface.

With reference to FIG. 12, the user interface can display another feeding page, which shows the food consumption progress. The user interface can display the food consumption of the pet as a percentage of the food placed in the smart apparatus 331. In this example, the pet has consumed 50% of the food placed in the smart apparatus. The user interface can convert the percentage of food consumed into a calorie number 333. In this example, the user interface states that the pet has consumed 502 calories. The user interface can indicate how many times the pet has been fed 335. In this example, the user interface indicates that the pet has been fed once.

The user interface can include an input for the type or brand of food that is being used with the smart apparatus 337. In this example, the brand of pet food is Pedigree. The brand and specific food being used with the smart apparatus system can be input manually, selected from a listing of different foods, or input through an optical, RF or other sensor. For example, in an embodiment, a user may photograph a container of food or the bar code of the container of food. The photograph can be compared to a database of pet foods to identify the brand and type of food being used with the smart apparatus. Alternatively, the food or beverage container may include an RFID or other low power RF mechanism. The database can include additional information about the pet food including: calories/weight, protein/weight, fat/weight, vitamins and minerals/weight, etc. The system can be calibrated based upon the brand of pet food being consumed. In this example, Pedigree pet food can be input and the pet food database can provide information about the pet food. In this example Pedigree pet food can have about 1.32 calories per gram. In many households, the caretakers may server different types of food or mix different types of food or add dietary supplements. In an embodiment, the smart apparatus system may With this information, the smart apparatus system can identify the proper food weight servings based upon the type and weight of the pet or human. In this example, the smart apparatus may recommend that a 3 year old 55 lb. 10 oz. female Labrador should be fed two meals of pet food per day with each meal having 1,004 calories to maintain this proper weight. The smart apparatus system can then calculate that 758 grams of Pedigree pet food has 1,004 calories. The caretaker can place the Pedigree pet food into the smart apparatus and the base can be illuminated green until 758 grams have been placed in the apparatus. At this weight, the base can be illuminated red to indicate that the precisely correct amount of food has been placed in the apparatus. The smart apparatus can report the pet's food consumption. In this example, the pet has consumed 50% of the food placed in the smart apparatus, which is 379 grams of food and 502 calories.

The feeding habits of the pet or human, which are monitored by the smart apparatus system, can indicate the status of the pet or human. For example, a happy pet may have regular feeding habits and consume all of the food placed in the smart apparatus. The pet's compliance with this regular feeding schedule can indicate that the pet is happy. In contrast, if the pet does not eat or substantially changes the eating habits, this can be an indication that there is a change in status or the pet may be sick. In an embodiment, the smart apparatus can analyze the timing of the feeding of the pet or human and predict a status based upon the feeding timing. In an embodiment, the system can display this status 339. In this example, the pet may have eaten at a normal time(s) and the smart apparatus interface may display the status as Happy.

Figure 13:
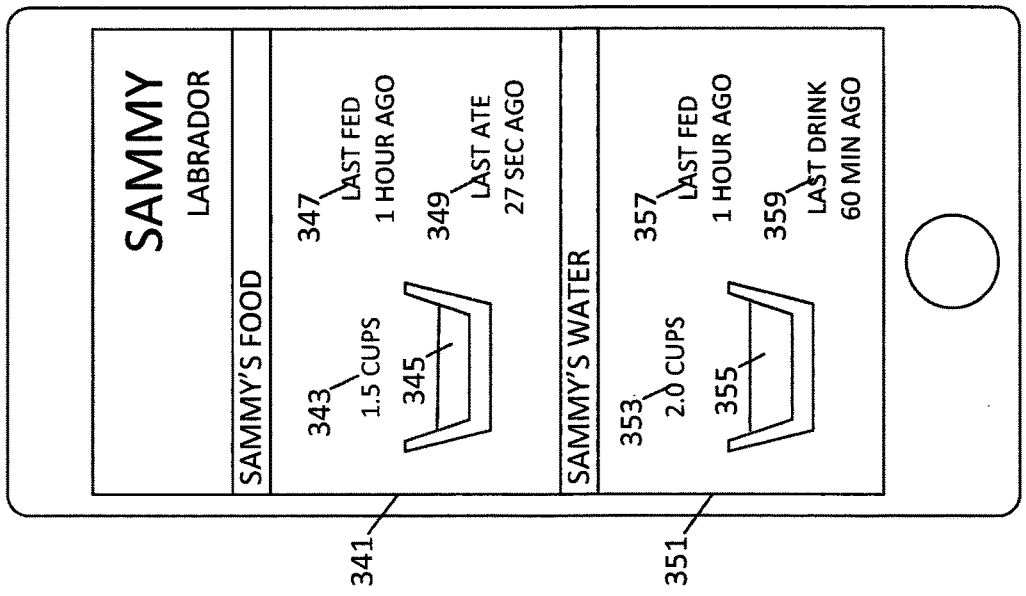
FIG. 13 illustrates an embodiment of a an animal or human's food eating and drinking information, consumption (or not) displayed on a user interface.

With reference to FIG. 13, in an embodiment, the smart apparatus system may include both a food apparatus and a water apparatus. The user interface can include a food apparatus section 341 and the water apparatus section 351 which include information about the food apparatus and the water apparatus. The food apparatus section 341 can indicate the quantity of food that has been fed to the pet in text 343 as well as a graphical representation of the food currently in the apparatus 345. The food apparatus section 341 can also indicate the time that the pet was fed 347 and/or the last time that the pet ate 349 and how fast the pet ate/how quickly the food was consumed, how many times the pet drank water over time. In the illustrated example, the pet was fed 1.5 cups of pet food one hour ago and the pet ate the food 27 seconds ago. In an embodiment, the smart apparatus can provide messages or reports indicating when the pet is consuming food or water abnormally. For example, the smart apparatus can transmit an alert if the pet drank all of his water in 10 minutes vs. the normal habits of drinking all of his water over an entire 8 hour day.

The smart apparatus can similarly provide information on the pet's water apparatus. The water apparatus section 351 can indicate the quantity of water that has been fed to the pet in text 353 as well as a graphical representation of the water currently in the apparatus 355, the time that the pet was fed water 357 and/or the last time that the pet drank 359. In this example, the pet was fed 2 cups of water one hour ago and the pet drank the water 60 minutes ago and drank ⅛ of a cup of water in 45 seconds, which can be reflected as normal (or not) relative to historical trends.

Figure 14:
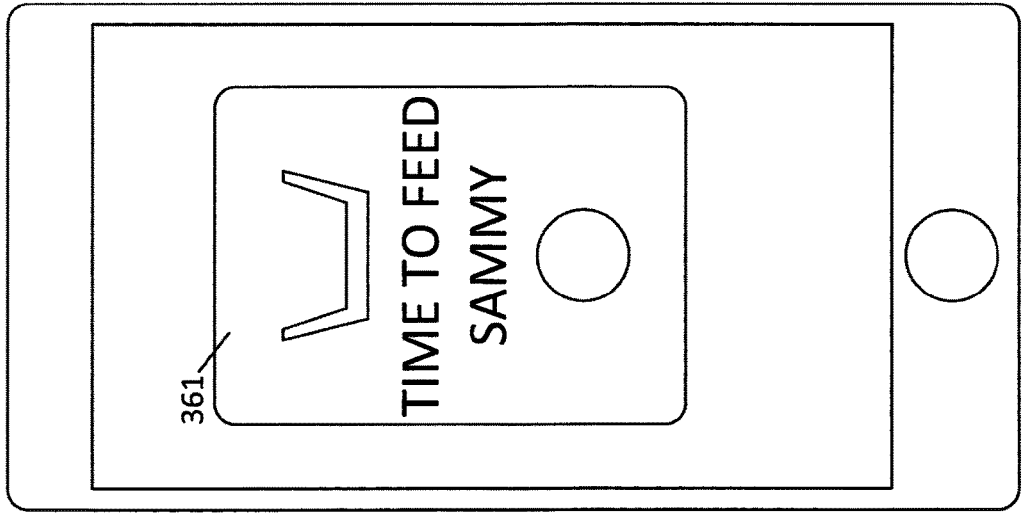
FIGS. 14-19 illustrate embodiments of feeding notifications and reminders transmitted to user interfaces on mobile computing devices.

As discussed, the smart apparatus system can provide reminders to the user for feeding the pet. With reference to FIG. 14, the user interface can display a message that it is time to feed the pet 361. In this example, an empty smart apparatus is illustrated with the message "Time To Feed Sammy." The user can close the reminder window and feed the pet or human user. Because the smart apparatus can detect when food and/or water is placed in the apparatus(s), the system can transmit the reminder again, if food or water are not placed in the apparatus(s) within a predetermined period of time, for example 15 minutes. These reminders can continue to be transmitted until apparatus(s) are filled to comply with the feeding schedule.

Figure 15:
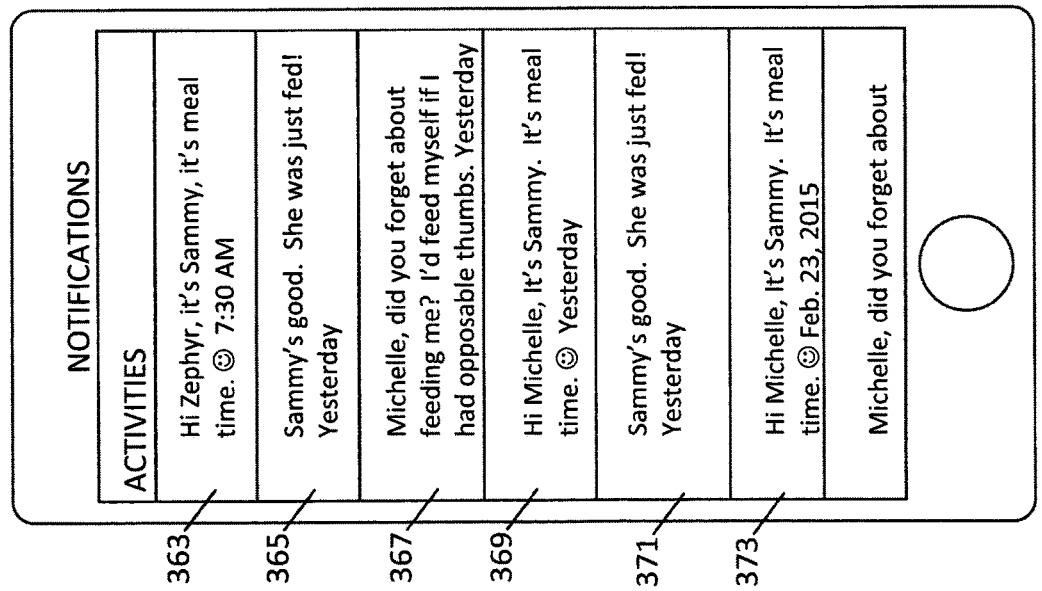

In other embodiments, the smart apparatus system can provide additional feeding reminders to the pet caretaker and/or other system users. For example, in an embodiment a pet can have a primary caretaker and a secondary caretaker who may want to monitor the pet's feedings that follows the responsibility ladder mentioned in the pack social network. With reference to FIG. 15, the smart apparatus system can change color to catch the caretaker's attention, transmit text messages or app alerts to the caretakers. In this example, the pet is Sammy and the caretakers are Zephyr and Michelle. In this example, the last text message 363 was at 7:30 AM to Zephyr informing him that Sammy needs to be fed. Zephyr can respond to this message by feeing Sammy. Zephyr does not have to do anything else besides feed Sammy for the entire social group to be informed seamlessly that Sammy has been fed (or hasn't).

In an embodiment, the smart apparatus can be configured to have different caretakers feed Sammy. The smart apparatus message from yesterday 365, 367, 369, 371 can be directed towards Michelle if she was the designated caretaker yesterday with copies of the text messages sent to both Zephyr and Michelle. The first message from yesterday 373 informs Michelle that Sammy needs to be fed. The second message from yesterday 371 is that Sammy is good and has been fed. The third text message from yesterday 369 can inform Michelle that Sammy needs to be fed which may be Sammy's second feeding for the day. The fourth message from yesterday 367 can be a reminder to Michelle that Sammy needs to be fed. The fifth message from yesterday 365 is that Sammy is good and has been fed. These messages can remind any caretaker to care for the pet and automatically provides information, schedule and instructions to them so that the pet will be properly cared for in the event that the primary caretaker is not available.

Figure 16:
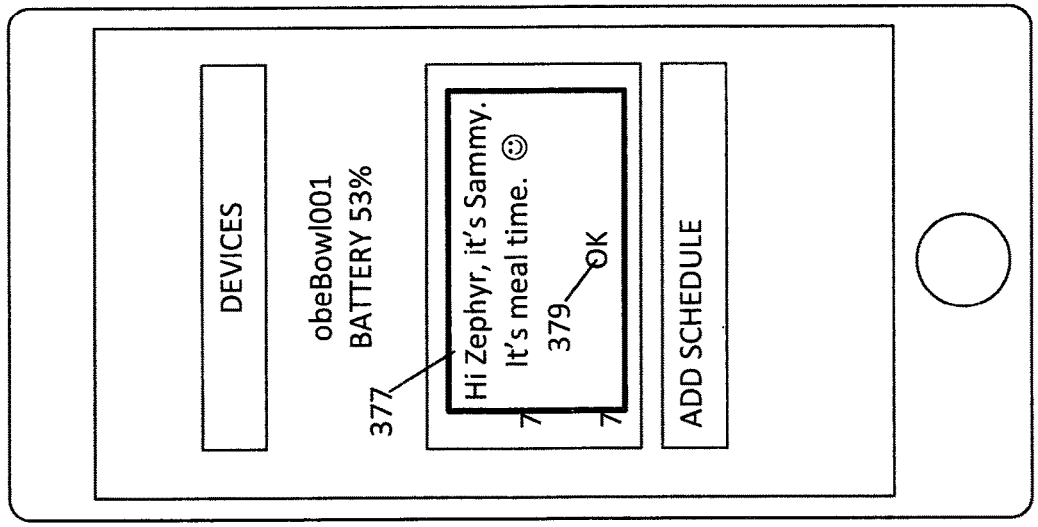
Figure 18:
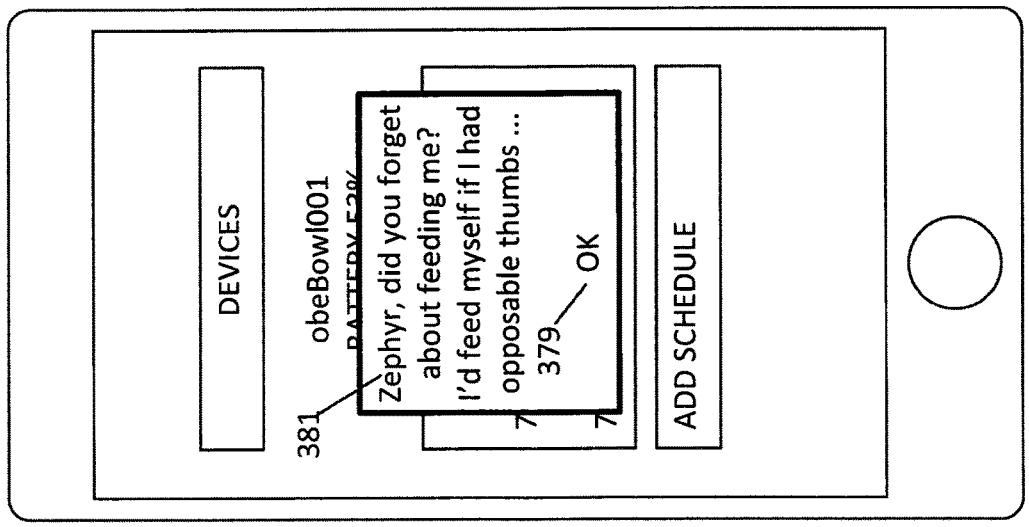
Figure 17:
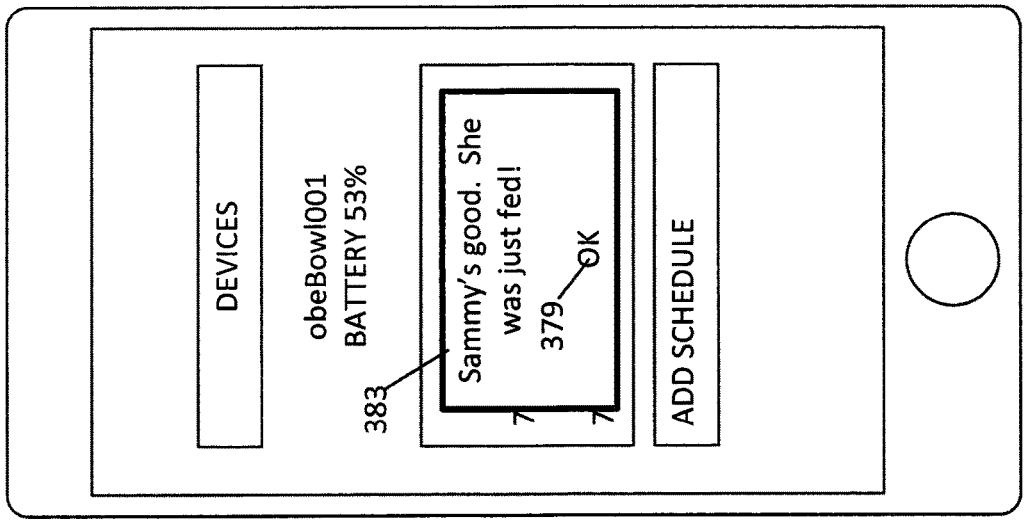

With reference to FIGS. 16-18, in other embodiments, the smart apparatus system may cause a pop up message to be displayed on the computing devices of the caretakers Zephyr and Michelle. With reference to FIG. 16, a feeding reminder 377 to the caretaker Zephyr to feed the pet Sammy is displayed. The user can read the message and then click the OK button 379 to close the pop up message 377 window. In FIG. 17, a second feeding reminder 381 to Zephyr to feed the pet Sammy is displayed. The user can read the message and then click the OK button 379 to close the pop up message 377 window. After the second reminder Zephyr feeds Sammy and the smart apparatus system can respond by transmitting a text message 383 stating that Sammy is good and that she was just fed.

Figure 19:
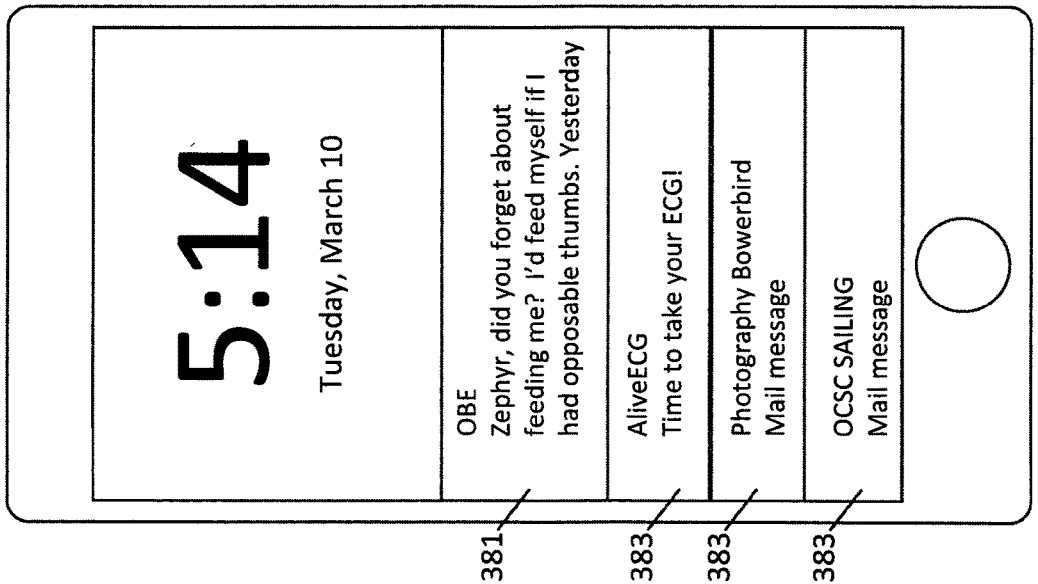
Figure 22:
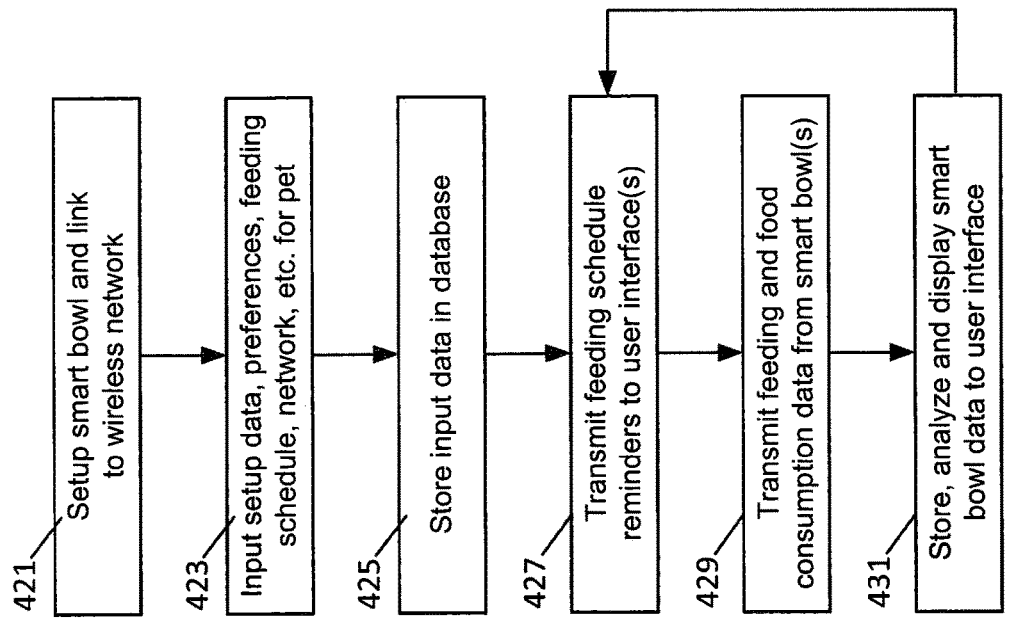
FIG. 22 illustrates an embodiment of a flow chart for smart apparatus setup and operation.

In yet another embodiment, the text messages from the smart apparatus system can be transmitted and displayed mixed in with other mobile computing device messages. For example, with reference to FIG. 19, the feeding reminder message 381 can be displayed with other mobile computing device messages 383.

Figure 20:
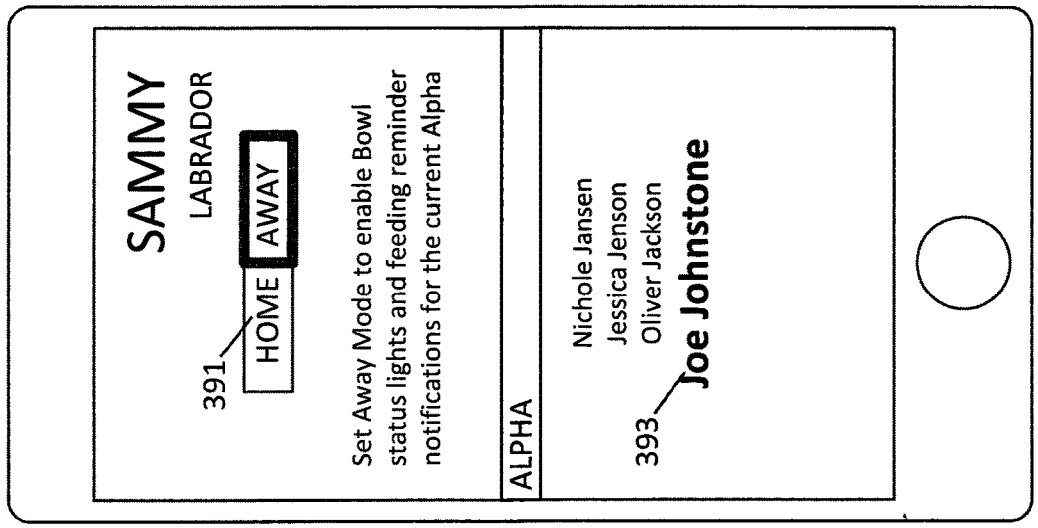
FIG. 20 illustrates an embodiment of a user interface that allows the user to adjust the caretakers who receive notifications like alerts, reminders, recommendations or motivational messages, habit reinforcement advice, warnings

In an embodiment, the primary caretakers in the "home" configuration of the smart apparatus system are Zephyr and Michelle as illustrated in FIGS. 15-19. With reference to FIG. 20, the smart pet apparatus system can include a user interface that has a home and away button 391 that allow the pet's or human caretakers to be adjusted when the primary caretaker(s) are not at home. In the illustrated embodiment, the system user has selected the away setting on the home and away button 391. In the illustrated example, the user has selected Joe Johnstone 393 to receive the feeding reminders.

Figure 21:
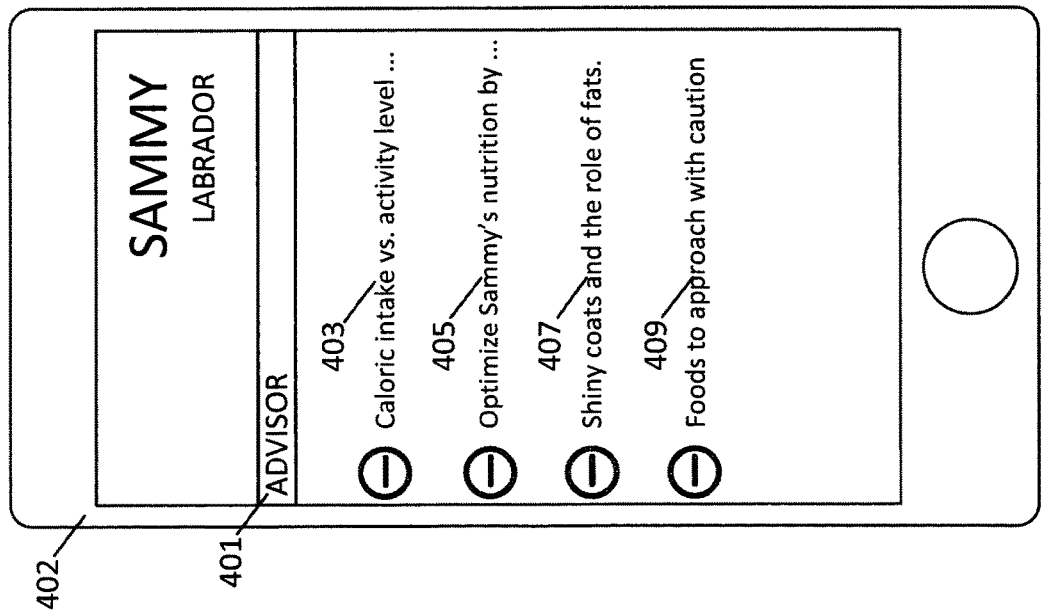
FIG. 21 illustrates an embodiment of a user interface that gives advice to system users based on the data the smart apparatus system has gathered.

In addition to providing pet or human specific information based upon the information provided by user and pet interaction with the smart apparatus, the user interface on the computing device may also provide general pet or human information. In an embodiment, pet or human care and health information can be stored in memory in the computing device and/or on the server. With reference to FIG. 21, the user interface can include an Advisor page 401 of a computing device 402 such as a smart phone. In this embodiment, the Advisor page 401 can include a menu of different topics including: Caloric intake vs. activity level 403, Optimize Sammy's nutrition 405, Shiny coats and the rule of fats 407 and Foods to approach with caution 409. For human users, the Advisor page 401 will be configured for human health needs. The user can click on any of the displayed subjects to obtain more information on the selected topic. The Advisor information can be updated and added to the server and the server can provide updates to the Advisor user interface page, which can be accessed by all system users.

Figure 27:
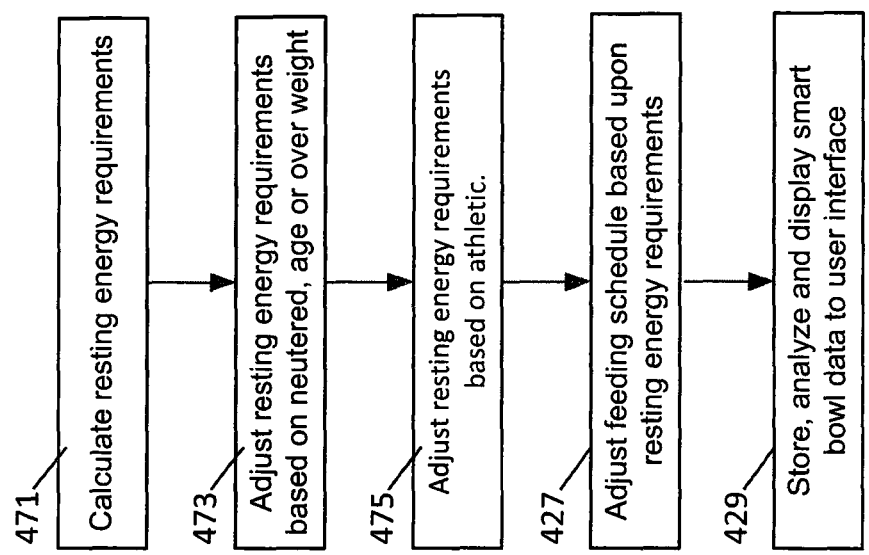
FIG. 27 illustrates a flowchart for the operation of a smart bowl.

As discussed above with reference to FIG. 1, in an embodiment, the server can include a database that stores information about the pet, the caretakers and the pet's feeding schedule. In an embodiment, the operation of the smart apparatuses can be represented by a flow chart as illustrated in FIG. 27. A setup procedure can be performed prior to using the smart apparatus linking the smart apparatus to a wireless network 421. In an embodiment, the smart apparatus system can be setup and linked to the other system components through a Wi-Fi wireless network. The smart apparatus system can determine the strength of the wireless connection signals and output information regarding the connection status and the smart apparatus battery charge. If the signal and/or battery are weak, the system can instruct the user to move the smart apparatus and/or charge the batter. In some cases the smart apparatus may need to be rebooted if there is an error in the network connection setup, the smart apparatus system can inform the user if rebooting is necessary. Once the smart apparatus is setup and connected to the wireless network, the setup data, preferences, feeding schedule, pack network information can be input through the user interface on the computing device for the pet 423. The setup data, preferences, feeding schedule, pack network information can then be stored in a smart apparatus database 425.

The feeding schedule feeding schedule reminders can be transmitted to the caretaker(s) through user interfaces on the mobile computing devices 427. In an embodiment, the server can follow the feeding schedule data and transmit the feeding reminder messages to the designated caretaker's mobile phone numbers and/or email addresses to remind the caretaker(s) to feed the pet as described above. In response to the reminders, the caretaker can fill a first smart apparatus with food and/or a second smart apparatus with water as described above. The smart apparatus(s) can detect the feedings as weight added to the smart apparatus(s). The smart apparatus(s) can then monitor the pet's consumption of food and water. More specifically, the smart apparatus weighs and tracks each meal including: how much food and water did the dog get fed, what times was the dog fed, how much food did the pet eat, how fast did the eat, has the pet been fed yet, when was the pet last fed. The smart water apparatus can similarly track the pet's water supply and consumption. For example, the smart water apparatus can track and determine: when the pet last drank, how much the pet drank, how often the pet drinks over time, and when the apparatus was last refilled. The smart water apparatus can also inform the caretaker when water needs to be added, when water needs to be changed and/or refilled, how much water does the pet normally drink, etc. The smart apparatus(s) can transmit the feeding and food consumption data to the server and mobile computing devices of the caretakers 429. The feeding and consumption data can be stored in the server database and processed to convert the weight change information into added useful data. The processed data can be displayed on the mobile computing device(s) of the caretaker(s) 431. The steps of transmitting feeding schedule reminders 427, transmitting feeding and food consumption data 429, and storing, analyzing and displaying pet apparatus data 431 can be repeated one or more times per day.

The smart apparatus data can be stored in the database and this information can be analyzed and processed. For example, the change in weight detected by the smart apparatus can be converted into other food metrics including: calories provided to the pet and consumed by the pet, volume of water provided and consumed by the pet, etc. In some embodiments, the smart apparatus can further analyze the feeding patterns of the pet to determine additional information. For example, if there have there been any changes in the pets food consumption pattern. In an embodiment, the smart water apparatus system an determine if there have there been any changes in the pet's normal food or water consumption patterns that can indicate medical or health issues. For example, if the pet has not eaten for an extended period of time, this can indicate possible illness or the health issues. In response to the detection of feeding anomalies, the smart apparatus system can transmit warnings to the caretaker(s) indicating that there may be a health problem with the pet.

In different embodiments, the smart apparatus system can be used with other components to perform additional features. For example, in many households a plurality of pets may share food from the same food apparatus and water from the same water apparatus. In order to distinguish the quantity of food consumed by each pet, the smart apparatus system may a pet identity sensor 441 which can detect a radio frequency ID, a Bluetooth ID or other identification signals, which are emitted from tags 442 or other devices worn by the different pets sharing the same food and/or water apparatuses. With this identification information, the smart apparatus can uniquely recognize and identify a pet when the pet is within a specified proximity threshold of the apparatus or makes contact with the apparatus. The pet identity sensor 441 on the apparatus/base may recognize the pet by recognizing a ID signal from the ID device worn by the pet. With this information, the smart apparatus system can determine which pet consumed a food and/or water and attribute the actual food consumption to each of the pets sharing the food apparatus. The smart apparatus system can then accurately determine the food consumption of each of the pets that share the smart apparatus.

In other embodiments, various other sensors can be used to distinguish pets so that the food and water consumption can be properly attributed by the smart apparatus system. In an embodiment, the smart apparatus 101 may have a visual ID sensor 443 which can include a camera or other light sensor, which can distinguish the pets based upon visual information detected by the visual ID sensor 443 and stored in memory 207. The processor 201 and visual ID sensor 443 can be used to accurately distinguish different identifications when each of the pets have distinct features such as different size, shape or color. In some embodiments, the visual ID sensor 443 can be used to scan pet food information. For example, the caretaker may place a pet food bar code in front of the visual ID sensor 443 and from the bar code, the smart apparatus 101 can identify the pet food that will be placed in the apparatus 103. In other embodiments, the pet food package or can may place a pet food bar code in front of the visual ID sensor 443 and from the package or can image, the smart apparatus 101 can identify the pet food that will be placed in the apparatus 103.

In some embodiments, the proximity sensor 445, which can be an infrared (IR) sensor which detects body heat. Humans have a lower normal body temperature than pets such as dogs. The IR heat output by pets can vary depending upon the hair or fur thickness. Thus, a long hair/fur pet can be distinguished from a short hair/fur pet with an IR proximity sensor 445 and stored in memory 207. Again, the smart apparatus 101 may be able to distinguish different pets based upon their distinct IR outputs and attribute feedings based upon these identifications.

In yet another embodiment, the smart apparatus 101 may include a smell sensor 447 which may detect particles emitted from a pet's mouth. The smell sensor 447 can be calibrated to detect particles or quantities of particles that are distinct to each pet and which is stored in memory 207. These particles are detected by the smell sensor 447 when the pet is near the smart apparatus 101. The processor 201 can identify the pet based upon the data from the smell sensor 447 and attribute feedings based upon these identifications.

In an embodiment, the smart apparatus 101 may communicate with a touch sensor 449 which can be placed adjacent to the smart apparatus 101. When the pet eats from the smart apparatus 101, the pet will place a paw on the touch sensor 449. Each pet can have a distinct paw print which is stored in memory 207 and the processor 201 can be configured to distinguish the different pets based upon the paw signals from the touch sensor 449. The processor 201 can attribute feedings based upon these identifications.

In an embodiment, the smart apparatus 101 can communicate with a weight sensor 451. Each of the pets may have a different weight, which is stored in the memory 207. When the pet feeds, the weight can be measured with the weight sensor 451 and the processor 201 can distinguish the different pets based upon the detected weight. The processor 201 can attribute feedings based upon these identifications.

In addition to attributing feedings with specific pets, the identification of the pets be used to control the time and quantity of food consumed. Based on the feeding schedule and pet identification, the smart apparatus 101 may prevent eating or drinking from that apparatus through various means. With reference to FIGS. 24 and 25, in an embodiment, the smart apparatus 101 can be placed within a housing 461 which can include a movable cover, flap or door 463 coupled to a lockable mechanism 464. The system can control the amount of food consumed in a predetermined period of time. For example, the lockable mechanism 464 can allow the door 463 to move and allow feeding in accordance to the feeding schedule. If the user consumes more food than allowed, the apparatus 101 can lock the lockable mechanism 464 to prevent further feeding until the feeding schedule allows additional feeding. The system can therefore control the amount of food consumed throughout the day.

If multiple pets are associated with the same smart apparatus, the smart apparatus 101 may discriminate between the different pets based on detecting the pets' identities and prevent some of the pets from feeding if they have exceeded their daily feeding allotment. The ID sensor can identify the individual pets. If the identified pet is allowed to eat more food according to the pet feeding schedule, the lockable mechanism 464 can be released to allow the door 463 to open and the pet to eat. However, if the identified pet is not allowed to eat more food according to the pet feeding schedule, the lockable mechanism 464 can be locked to prevent the door 463 from opening open and prevent the user from eating.

With reference to FIG. 26, in an embodiment, the smart apparatus 101 may be coupled to a feeding mechanism, which can be used to store, and release food into the apparatus 103. In this embodiment, the feeding mechanism 470 may include a food storage container 471, which stores a supply of pet food and a valve 473. In this configuration, the smart apparatus 101 can be configured to transmit feeding signals to the feeding mechanism 470. At the designed feeding times as set by the pet's feeding schedule, the smart apparatus 101 can transmit a signal to the valve 473 which can open to release food into the apparatus 103. As the food released from the storage container 471 to the apparatus 103, the weight of the pet food in the apparatus 103 is detected. When the scheduled weight of pet food has been released, the smart apparatus 101 can transmit a signal to the valve 473 to close so that no more food is placed in the apparatus 103. The feeding mechanism 473 can communicate with the caretaker through the smart apparatus 101 and provide notices including: running low on food, ran out of food, valve malfunction, etc.

In an embodiment, the system can use a smart dispenser such as the storage container 471 to track the caloric and nutritional value, vitamins consumed by the user exactly. Multiple storage container 471 can be used which can each store, vitamin, water, condiment, probiotic powder, and/or other foods, liquids, supplements. The storage containers 471 can provide exact measurements of the poured, pumped, sprinkled or dispensed weights or volumes from the storage container 471. The smart storage containers 471 dispenser can upload the consumption data to add to the overall health picture, nutritional daily allowance and/or diet regimen. So often, condiments like mayonnaise or salad dressing add "invisible" calories that add up and are hard to track. This storage containers 471 system enables that tracking exactly and effortlessly for the consumer. The smart storage containers 471 dispenser is able to differentiate the user by a sensor(s) that uses biometrics to understand who is using what and how much.

As discussed, the user can configure the smart apparatus system to output reminder messages as a user desires. For example, in an embodiment, the system can have a caretaker hierarchy management. Depending on the communication preferences set based on a caretaker status, like caretaker home or away, the smart apparatus can be configured to communicate through different signals. In a normal at home mode, the communication can be performed with light signals. At the base 105 of the smart apparatus 101, a light ring surrounding the base 105 can illuminate a color through the translucent base 105. In addition to the light signals, additional output signals emitted by the smart apparatus 101 may include sound, vibration, different light colors, different light patterns such as rapid blink, slow blink, dot/dash patterns, etc. In some embodiments, the light output of the smart apparatus 101 may be able to display: numbers, icons, text, characters, etc. The default settings are set for caretaker home or away. Users may create any predefined status based on the caretaker's preferences or location. For example, a caretaker can configure the smart apparatus status to change from home to away when the caretaker phone is more than a predetermined distance away from the smart apparatus. In an embodiment, the smart apparatus system can monitor the GPS coordinates of the smart phone computing device of the caretaker. The smart apparatus can be configured to be switch from home to away when the caretaker is a user specified distance from the apparatus, for example 15 miles away. In an embodiment, these settings are rules based on what a user wants. In another configuration example, a user may choose to get a text every time the dog takes a drink or get an app alert when the dog starts eating. The status is set at the cloud level and stored in the smart apparatus's memory.

In an embodiment, the smart apparatus system can share information with a pet activity tracker and adjust the meal servings based upon the activity level of the pet. The smart apparatus can determine if the pet has been overfed or underfed compared to the pet's feeding schedule and activity level. In an embodiment, the feeding calories adjustments based upon activity level can be saved as rules or algorithms in the memory of the server and/or computing device.

As discussed, the user can setup the feeding schedule through the user interface as described above with reference to FIG. 5. In some embodiments, the smart apparatus system may be able to recommend a feeding quantity for the scheduled feedings for the pet based upon the pet data. In an embodiment, the smart apparatus system may calculate the resting energy requirements for the pet based upon the weight of the pet. In the following example the food requirements are calculated for dogs. In other embodiments, different algorithms can be used for cats and other types of pets.

$$\text{Resting Energy Requirements (RER kcal/day)} = 70 \times \text{body weight (BW kg)}^{0.75}$$

Once the RER for a dog is calculated, adjustments to the RER can be made. For example, if any of the following conditions apply to the dog then the RER can be reduced by 20%, 1) dog has been neutered, 2) dog is 8 or more years old and weights 5-60 lbs, 3) dog is 5 or more years old and weights 61 or more pounds, 4) dog has a body condition score (BCS) greater than 5. The BCS score is determined based upon the dog's characteristics in table 2 below.

TABLE 2

| BCS | Status | Physical Characteristics |
|---|---|---|
| 1 | Too thin | Ribs, lumbar vertebrae, pelvic bones and all bony prominences evident from a distance. No discernible body fat. Obvious loss of muscle mass. |
| 2 | Too thin | Ribs, lumbar vertebrae and pelvic bones easily visible. No palpable fat. Some evidence of other bony prominence. Minimal loss of muscle mass. |

TABLE 2-continued

| BCS | Status | Physical Characteristics |
|---|---|---|
| 3 | Too thin | Ribs easily palpated and may be visible with no palpable fat. Tops of lumbar vertebrae visible. Pelvic bones becoming prominent. Obvious waist and abdominal tuck. |
| 4 | Ideal | Ribs easily palpable with minimal fat covering. Waist easily noted, viewed from above. Abdominal tuck evident. |
| 5 | Ideal | Ribs palpable without excess fat covering, Waist observed behind ribs when viewed from above. Abdomen tucked up when viewed from side. |
| 6 | Too heavy | Ribs palpable with slight excess fat covering. Waist is discernible viewed from above but not prominent. Abdominal tuck apparent. |
| 7 | Too heavy | Ribs palpable with difficulty; heavy fat cover. Noticeable fat deposits over lumbar area and base of tail. Waist absent or barely visible. Abdominal tuck may be present. |
| 8 | Too heavy | Ribs not palpable under very heavy fat cover, or palpable only with significant pressure. Heavy fat deposits over lumbar area and base of tail. Waist absent. No abdominal tuck. Obvious abdominal distention may be present. |
| 9 | Too heavy | Massive fat deposits over thorax, spine and base of tail. Waist and abdominal tuck absent. Fat deposits on neck and limbs. Obvious abdominal distention. |

If a dog is: a senior, neutered, or overweight and meets any of these listed conditions, the RER can be reduced. In an embodiment if a dog meets one or more of the listed conditions, the RER can be reduced by 20%. Conversely, if a dog is athletic and active and does not meet any of the RER reduction requirements, then the RER can be increased by 20%.

As an example, the feeding schedule recommendation for a 5 year old dog that weighs 63 lbs (28.64 kg) and has a body with: slight fat covering his ribs, a waist observed behind ribs when viewed from above and an abdomen tucked up when viewed from side, the smart apparatus can make a feeding recommendation based upon this information. For example, the RER $70 \times 28.64^{0.75} = 866.5$ calories. Since the dog is 5 years old and weights more than 61 pounds and has a body condition (BCS) score of 6 which is greater than 5, the RER is reduced by 20%. The total daily calories are: $866.5 - 0.2 \times 866.5 = 693$ calories per day. The smart apparatus system can know that the pet food brand and type input to the system by the caretaker can be 1.32 calories per grain. From this information, the smart apparatus system can calculate that the dialing feeding is equal to 693 calories per day/1.32 calories per gram=525 grams of pet food per day. The caretaker may have also input the desire to feed the dog equal sized feedings twice a day, breakfast and dinner. The smart apparatus system can then determine that each feeding should be 525 grams per day/2 feedings per day=262.5 grams of food per serving.

The described feeding algorithm can be adjusted based upon various other factors, which can be related to the pet's health. The algorithm may also be adjusted based upon historical data collected for the pet and other pets by the server. For example, the smart apparatus system may collect the food consumption rate of the pet. A fast food consumption rate can indicate that the pet is hungry and possibly underfed. In contrast, a slow or only partial food consumption rate may indicate that the pet is full and being over fed or that the pet is sick. The feeding algorithm may also be adjusted for the activity of the pet. A high level of activity can indicate a healthy pet, which may also require more food while lower than normal activity can indicate a health problem with the pet. As discussed, the smart apparatus system can be used with pet identifiers to accurately identify the feeding, food consumption and activity levels of each pet in a household.

In many cases the pet's digestive characteristics can be predicted based upon the pet's genetics (DNA), nutrient profile, metabolism, medication being taken, age, breed, ambient temperature, altitude, date, time, and other possible factors. The normal metabolism of the pet can be related to the genetics and breed of the pet. For example, large breed puppies such as Golden Retrievers can develop serious joint disease if fed a diet that is too high in calories or calcium. It is critical that Golden Retriever puppies grow up eating an appropriate diet so their bones develop properly. In contrast Dachshund breed dogs may require a diet that promotes a lean body mass, which can prevent back injuries, which can be common because of this breed's elongated body. In an embodiment, the UI of the smart apparatus app can have an input for the breed of the pet. Many dogs are not pure breeds so the UI may have a provision for inputting multiple breeds based upon the DNA analysis or the known breed mixture. For example, the UI may allow the user to input a mixed breed such as 50% Jack Russell Terrier and 50% Italian Greyhound. The smart apparatus system may have a breed database, which includes metabolism or RER adjustment data for different breeds of pets. The smart apparatus system can calculate an RER correction factor based upon mixed breed pets based upon an algorithm or interpolation process. For example, a Jack Russell Terrier may have a 0.1×RER correction factor and an Italian Greyhound may have a 0.04×RER correction factor. With a 50% mix, the breed correction factor can be (0.10×0.50)+(0.40×0.50)=0.70.

Different pets can have different nutrient profiles based upon the breed and medical condition of the pet. In an embodiment, the nutritional profile for different breeds can be stored in the smart apparatus server database. In other embodiments, the nutritional provide can be adjusted based upon the pet's medical condition. For example, a diabetic pet may need to be placed on a diet that is high-fiber and low fat. The pet may also need to be fed small portions of food several times per day to keep the pet's insulin levels as close to normal as possible throughout the day.

In some embodiments, the pet's medication can be input through the smart apparatus app UI. The smart apparatus system can respond by adjusting the feeding schedule based upon the requirements of the pet's medication. The medication schedule can also be stored in the feeding schedule in the server database. The medication reminders can be included in the feeding reminders. In some embodiments, the recommended feedings calculated by the feeding algorithm can be adjusted based upon the ambient temperature. The pet may store more fat on the body in response to lower temperatures and store less body fat in response to higher ambient temperatures. Thus, it may be necessary to a lower caloric intake when the ambient temperature is lower and conversely increase the caloric intake if the stored body fat becomes too low in higher ambient temperature environments. In an embodiment, the smart apparatus system can detect the ambient temperature and adjust the recommended feeding RER adjustment accordingly. In some areas, the ambient temperature fluctuates based upon the seasons. In an embodiment, the smart apparatus system may determine the season and the average ambient temperature based upon historical data and/or measured data and make adjustments accordingly. More specifically, the smart apparatus system may feed the pet less pet food in the colder winter and more pet food in the warmer summer months. In another embodiment, the caloric intake of the pet can be adjusted based upon the altitude. In an embodiment, the apparatus sensor of the smart apparatus base can include a pressure sensor, which can detect the estimated altitude or a GPS unit, which can detect the altitude. Humans who live in high altitude communities are less likely to be overweight than those living at sea level. Thus, there can be a relationship between altitude and caloric intake. Because most pets live at or near sea level, the smart apparatus system may adjust the feeding volume when the pet is at higher altitudes such as 3,000 feet or more. In an embodiment, the smart apparatus system can adjust the recommended feeding by increasing the feedings in proportion to the altitude of the pet.

The pet feeding information including RERs and RER adjustments can be stored in the memory with the feeding schedule in the memory of the smart apparatus, in the server memory and possibly on the computing device. When the feeding messages are sent to the caretaker, food can be placed in the smart apparatus, which can signal more food needs to be placed in the apparatus until 262.5 grams have been detected by the weight sensor. The smart apparatus can signal the caretaker to stop placing food in the apparatus after the recommended quantity has been served to the dog. The pet can then consume the pet food and the described reminder and feeding process can be repeated for the subsequent feedings.

In other embodiments, other algorithms can be used to alter the RER values to determine the daily caloric intake for a pet. For example, Table 3 lists the Estimated Total Daily Energy Needs WIDEN) correction factors based upon the physical condition of the dog. The ETDEN correction factors can be based upon various conditions of the dog. From the RER and the physical characteristics of the dog, the smart apparatus system can determine the dog's ETDEN and then the recommended feedings based upon the caretaker's feeding preferences.

TABLE 3

| Condition | Estimated Total Daily Energy Needs |
| --- | --- |
| Neutered adult | = 1.6 × RER |
| Intact adult | = 1.8 × RER |
| Inactive/obese prone | = 1.2-1.4 × RER |
| Needs weight loss | = 1.0 × RER for ideal weight |
| Needs weight gain | = 1.2-1.8 × RER for ideal weight |
| Active, working dogs | = 2.0-5.0 × RER |
| Puppy 0-4 months | = 3.0 × RER |
| Puppy 4 months to adult | = 2.0 × RER |

The feeding calculations for a 10 kg neutered adult dog are described. The dog's can be input through the user interface of the app running on the computing device. The app can calculate the RER as $70 \times (10)^{0.75} = 394$ calories/day. The dog is a normal weight adult and the most accurate listed condition that the dog meets is that he is a neutered adult. The ETDEN can be calculated based upon the neutered adult condition of the dog as: 1.6×294 calories/day=470 Calories/day. The smart apparatus system can know that the pet food brand and type input to the system by the caretaker can be 1.32 calories per gram. From this information, the smart apparatus system can calculate that the ETDEN is equal to 356 grams of pet food per day. The caretaker may have also input the desire to feed the dog equal sized feedings twice a day, breakfast and dinner. The smart apparatus system can then determine that each feeding should be 178 grams of food and this information can be stored in the memory with the feeding schedule on the memory in the smart apparatus, in the server memory and possibly on the computing device. When the feeding messages are sent to the caretaker, food can be placed in the smart apparatus, which can signal more food needs to be placed in the apparatus until 178 grams have been detected by the weight sensor. The smart apparatus can signal the caretaker to stop placing food in the apparatus after the recommended quantity has been served to the dog. The pet can then consume the pet food and the described reminder and feeding process can be repeated for the subsequent feedings.

In an embodiment, the suggested feeding values can be changed over time to adapt to the needs to maintain a healthy weight and/or diet. For example, with reference to FIG. 23, in an embodiment the smart apparatus system 101 can be used with a weight sensor 451. The weight sensor 451 can track the weight over time with weight data from the weight sensor 451 being stored in the memory 207. In an embodiment, an "ideal weight" range can be stored in memory 207 can be adjusted based upon changes in weight over time. If the user's weight remains within the ideal weight range, the ideal weight will remain constant. However, if the weight of the decreases below the ideal range, the smart apparatus 101 can adjust the feeding to increase food consumption until the user is back within the ideal weight range. Conversely, if the dog's weight increases above the ideal weight range, the system will decrease food consumption so that the user is fed less food until the weight returns to the ideal weight range.

In an embodiment, the change in feedings can be proportional to the deviation from the ideal weight range. For example, if a user is 10% over the ideal weight range, the system can be reduce the feedings by 10% for caloric intake. This system can account for variations in the user's feeding and exercise activities. For example, if a user has been feed additional food or snacks, which were not part of the stored feedings schedule, the weight sensor may detect the consumption of this extra food and make a correction in the subsequent scheduled feedings. Similarly, if the user has been more active than normal and has lost weight as a result of this activity, the smart apparatus can increase the feedings to account for this added activity.

In another embodiment, the feedings can be adjusted based upon the user's body mass index (BMI). The caretaker may input information about the user including: gender, height and weight. The BMI can be calculated as: BMI=weight in kg/(height in meters)$^2$. The ideal BMI range can be stored for gender and body type. If the BMI is above the ideal BMI range, the feedings can be reduced so that less food is fed to the user. Conversely, if the BMI is below the ideal BMI range, the feedings can be increased and more food can be fed to the user. It can be difficult for caretakers to visualize the excess and unhealthy weight that the user may be carrying. In an embodiment, the user interface of the caretaker's computing device can display images, which can be illustrations, silhouettes, photographs, or other images of a human with a corresponding BMIs. This can help a caretaker to more accurately understand and interpret the user's BMI values.

In another embodiment, the smart apparatus system 101 may communicate with an activity sensor 453 which may include a system for detecting a user's activity level through a global positioning system (GPS) sensor and/or accelerometers. The user activity sensor 453 may also calculate the user's exercise level. In an embodiment, the user's activity level can be transmitted from the activity sensor 453 to an ID sensor that can associate the user's activity readings with the user's identification. The processor 201 can then adjust the feedings based upon the user's activity. If the user's exercised more than normal, the feedings can be adjusted to increase the food provided at the next feeding. The increase in food can be proportional to the added activity level. For example, a 20% increase in activity over normal can result in a 5% increase in the next feeding.

The smart apparatus system can also monitor the hydration levels of the user. The hydration can be based upon the ambient temperature and humidity as well as the activity level of the user. The smart apparatus system can detect the drinking rate of the user and notify the caretaker when the user is consuming higher than normal rates of water, which may indicate dehydration. The smart apparatus system can also compare the user's water consumption to that of other system users, which can be stored in a database of water consumption. In some embodiments, the database may include drinking data for users with specific medical conditions such as user that are sick or may have kidney illnesses. For example, dehydration can lead to kidney failure and detecting drinking patterns, which match those of users who have had kidney failure can be critical information in prevention. If abnormal drinking behavior, which may indicate a health issue is detected, the smart apparatus system can transmit a warning message to the UI of the caretaker's computing device.

In some embodiments, the smart apparatus 101 may also communicate with other Wi-Fi devices in a home network such as smoke alarms and thermostats, which can communicate with computing devices such as smart phones. In an embodiment, the smart apparatus may turn off/or on or modify its behavior based on any other smart device in the home, for example, a smart thermostat, smart fire alarm or a smart home hub. If the hub or thermostat settings are changed to away, the dog apparatus may be triggered to set alarms and reminders. The smart apparatus system may assume that the dog is at home and someone else is taking care of him and ask for a caretaker confirmation through the app on the care taker's smart phone computing device. The caretaker can then confirm or inform the smart apparatus that the dog is with the family. The smart apparatus can adjust the settings based upon the confirmed location of the pet. The smart apparatus can also adjust its functionality based on smoke alarm status or smart-thermostat. For example, in response to a fire, the smart apparatus may receive the fire signal from the smoke alarm and respond by emitting a siren sound and broadcasting a pet notification message such as "dog inside" or "cat inside". These notifications can be useful to alert firemen to aid in rescuing the dog.

In an embodiment, the pet's feeding and other information such as water consumption, weight and activity can be stored in the smart apparatus, server and/or computing device memory. This data can be transmitted to a data platform for veterinarians. For example, the smart apparatus system can send real time and trended information to veterinarian on consumption habits. With this information the veterinarian can work with owner to put pet on diet regimen and monitor the pet's nutrition and health. Based on the pet's behavior and owners feeding preferences, the veterinarian can recommend feeding or diet regimen to help a pet lose weight and/or to increase the pet's water intake.

In addition, this information can be shared with pet food companies. As discussed, the specific pet food being used with the smart apparatus is known and this smart apparatus stored information can be shared with the pet food companies so that they can better understand detailed feeding behavior of customers. By knowing the existing consumers, the food companies can market to targeted, specific demographics of the customers.

With reference to FIG. 23, in an embodiment, the smart apparatus 101 can communicate with various other sensors such as a saliva sensor 455. The saliva sensor 455 can be mounted in the water apparatus or as a separate structure that is licked by the pet resulting in saliva being left on the saliva sensor 455. In an embodiment, the output of the saliva sensor 455 can be used by the smart apparatus 101 to detect level of hydration of the pet based upon the chemical make up of the saliva. In an embodiment, the smart apparatus system 101 can transmit a warning message to the computing device of the caretaker if dehydration of the pet is detected. In an embodiment the saliva sensor 455 can detect bacteria and parasites in the user's saliva. For example, bacteria such as pastuerella may inhabitant of the mouth in cats and dogs which can cause skin, lymph node and, sometimes, more severe infections. *Bartonella henselae* is a bacterium that is transmitted to cats from fleas is also housed in the cats' mouths. If these types of bacteria or parasites are detected in the saliva by the saliva sensor 455, the smart apparatus can inform the user that the caretaker the pet may need veterinary care to kill these bacteria. The stored information can be forwarded to the veterinarian so that the proper treatment can be prescribed for the pet. For example, the DNA sample data can also be used to identify health risk factors for this animal and recommend care, diet, exercise and medications. In some embodiments, the saliva can be used for DNA sample data, which can be used to determine the origins or breed of the pet.

In some implementations, behavioral patterns, preferences (e.g., notification and reminder settings), nature of interactions with the smart apparatus system, or other observed attributes of human users (caretakers of a pack) or pets may be monitored over a duration of time to build a learned model for individual human users and/or their pets. Features of the learned model with respect to the user or pet can then be used to modify configuration, settings, and rules of the smart apparatus system in association with that given user or pet. For example, the smart apparatus may observe the timing of the scheduled feedings, waterings, medication dispensing, and additional neurtraceuticals from the primary and secondary caretaker preference input data. The smart apparatus system can then determine if there are any problems with this scheduling. In some embodiments, the smart apparatus may observer pet behavior that may indicate there may be a problem with the feeding schedule. For example, the smart apparatus may detect the pet licking or touching the empty apparatus, which may indicate that the pet is hungry but unable to eat. The smart apparatus may record these observations and report these behaviors to the caretaker(s).

In an embodiment, the smart apparatus system can monitor and record the pet feedings and food consumption and other pet behavior and/or detected physical characteristics of the pet. The smart apparatus system can analyze the pet's behavior and physical characteristics and determine if there is any abnormal data that may indicate a health problem with the pet. This analysis can be based upon various different comparisons including: comparisons to normal pet behavior and comparisons to data from other pets that are the same or similar breed, age weight and possibly gender. The smart apparatus may detect a problem if the pet did not eat some or all of the food that has been placed in the food apparatus within several hours more than normal. For example, the smart apparatus may know based upon the pet's past feeding history that the pet normally consumes 400 grams of pet food within 2 hours of the food being placed in the smart apparatus. The pet's feeding patterns can be stored in the memory of the pet apparatus, the server and/or the computing device. The smart apparatus system may respond to this eating anomaly by transmitting a message to the caretaker's smart phone computing device so that the caretaker will know that there may be a problem and the pet can be examined possibly be a veterinarian.

In other embodiments, the smart apparatus system server can record the feeding and food consumption patterns of many pets in different homes and locations that are using all using the smart apparatus system. The smart apparatus system server can analyze, group and compare the feeding and eating patterns of many different pets. The server may group the pet feeding and eating data based upon the types of pets, the ages of the pets, the genders of the pets, the weights of the pets and the physical conditions of the pets. Based upon this information, the server may be able to identify normal ranges of food consumption and behavior and normal ranges of physical conditions. In an embodiment, the smart apparatus server can compare an individual pet's feeding behavior to normal data ranges derived from many similar pets. The smart apparatus system may respond to any detected anomalies by transmitting a message to the caretaker's smart phone computing device so that the caretaker will know that there may be a problem and the pet can be examined possibly be a veterinarian.

In addition to informing the caretaker of abnormal physical characteristics and behaviors, the smart apparatus system can make recommendations on how to respond to the detected abnormal conditions. The smart apparatus system may also allow users to access general information on pet health care. This feature of the smart apparatus system can be known as the smart apparatus advisor. For example, the caretaker may be interested in the pet health topic of a raw food diet. The caretaker may input "raw food" into a search menu of the smart apparatus advisor database. The smart apparatus system can respond to this inquiry by displaying information about raw food diets.

In an embodiment, the pet apparatus system may detect changes in the pet's behavior or abnormal feeding behavior. For example, the smart apparatus system may detect that the pet has not consumed the normal volume of water. The smart apparatus system may inform the caretaker that the pet has not consumed a sufficient volume of water compared to the pet's normal behavior and the cumulative data from many other similar pets. The smart apparatus system may suggest ways to encourage the pet to drink more water such as: adding ice cubes to the water, adding broth to flavor the water, adding water to the dry pet food, etc. Hopefully the recommended suggestions from the smart apparatus system will correct the pet's lack of water consumption. However, if the pet continues to not drinking enough water, the smart apparatus system will detect this and recommend that the caretaker bring the pet to a veterinarian.

As discussed above with reference to FIG. 23, the smart apparatus system can include or be in communication with various different sensors, which can detect various different physical characteristics of the pet. In an embodiment, the smart apparatus system server may compile information for many different pets and store this information in a database and compare the behavior and physical condition of each pet to the "normal" data for the pet as well as the cumulative "normal" data from many pets. When abnormal data is detected, the smart pet apparatus system can transmit messages to the caretaker's computing device smart phone informing the caretaker of the detected data. For example, if contamination is detected, the smart apparatus system can instruct the caretaker to remove the food and/or water from the smart apparatus and cause the smart apparatus to emit an alarm, which may prevent the pet from consuming the contaminated food. If the activity level is substantially lower than normal, the smart pet apparatus may instruct the caretaker to check the physical condition of the pet for illness or injury. In some cases, a combination of data may indicate a more specific diagnosis.

In some embodiments, the smart apparatus can be configured to identify or be informed of certain physical conditions and then adjust the feedings based upon these conditions. For example, if a pet is pregnant the system can be adjusted to provide more food so that the pet has sufficient caloric intake based upon the progress of the pregnancy. The caretaker may inform the smart apparatus system of the pet pregnancy. The advisor can identify a recommended feeding program for this physical condition. The caretaker will then have the option of accepting, modifying or rejecting the recommended feeding program. If the caretaker accepts the smart apparatus feeding recommendations a revised feeding schedule for the pet can be applied for the duration of the pregnancy. The user may be able to input status updates for the pet pregnancy and the smart apparatus system can continue to adjust the feeding schedule. Once the pet has given birth, the feeding schedule may continue to provide more food than normal as the pet nurses her babies. Once the babies are no longer nursing, the smart apparatus system may return to a normal feeding schedule. The system may continue to receive information from other sensors and compare this data to normal or larger subject data that has been collected by the smart apparatus server throughout these special physical condition situations. However, because weight gain is normal and necessary during pregnancy, the smart apparatus system can track and maintain a proper feeding program that corresponds to the healthy weight requirements of the pet.

In other embodiments, the smart apparatus system feeding schedule can be adapted for other physical conditions. For example, if a pet breaks a leg, the activity level can be reduced while the leg heals. A caretaker can input the type of injury and expected recovery time. The smart apparatus feeding schedule can be adjusted to reduce the calories of food provided during the recovery time. As the pet heals and becomes more active the calories per feeding can be increased and may be brought back to a normal schedule once the pet has fully recovered and resumes a normal activity level. In an embodiment, the activity level can be monitored and recorded by activity trackers. For food and water and other information can be used by the smart apparatus advisor to automatically recommend a modified caloric feeding schedule if necessary. The server may also 'push notifications' to the apparatus to help alert caretakers. For example, in the event of a dog food recall, a push notification "Red Alert" may be activated to help prevent the dog from being fed that food.

In an embodiment, the smart apparatus advisor can provide a health assessment of the pet based upon several variables including: DNA, nutrient profile, metabolism, medication being taken, age, breed, ambient temperature, altitude, date and time. As the smart apparatus is used with the pet, this pet information can be stored and monitored over time. The health assessment can indicate if the pet is maintaining proper health metrics, becoming healthier or if the pet is becoming unhealthy for any reason. In response to health degradation, the smart apparatus can make recommendations to the care taker for correcting these problems through the advisor section of the UI.

Table 4 below lists the possible information that can be detected and recorded by the smart apparatus system.

TABLE 4

|  | Caretaker preferences | Caretaker hierarchy | Pet behavior |
| --- | --- | --- | --- |
| Schedule-feeding, watering, medication dispense, additional nutraceutical | Feeding time, daily, weekly monthly and variance | Who the backup caretakers are based on each situation | Observation if pet licks, touches apparatus, logged |
| Comparison of this day, week, month year to last | Reminders of upcoming events or proactive messaging | Reminders of upcoming events or proactive messaging |  |
| Comparison to other dogs same age, breed size |  |  | Learn how pet varies compared to the common sample |
| Who the caretaker is and corresponding Settings | x | x |  |
| GeoFence rules | If at home x, if at the gym y, if out of the country z | Based on geo changes—corresponding hierarchy i.e. If in kennel then feed three times a day |  |
|  | Update of contacts and numbers or pack relative to location - if in Georgia, then the emergency vet is 404 | Update of hierarchy |  |
| Caloric consumption and nutrition |  |  | Increased activity, weight or as the dog ages update recommendations for nutrition and caloric content |
| Hydration |  |  | Increased activity, change in health, weight or as the dog ages update recommendations for hydration |

The smart apparatus system can include a caretaker advisor that can be accessed by the caretakers through the user interfaces on the caretaker computing devices such as smart phones. The caretaker advisor can provide various types, classes of recommendations including pet care and health guidance and information through text articles, video recordings, interactive caretaker questionnaires stored in the server database and/or caretaker computing device memory. The smart apparatus advisor can be used by pet owners to obtain guidance for pet care over the life of the pet. The information from web resources, academic articles and archives, veterinary experts and services, and the like may be used in conjunction with observed (e.g., behavioral or physiological patterns) or user-provided information (e.g., age, breed, temperament) about the pet to provide guidance/advice/suggestions to the human user with regard to managing their pet. This augmented advice can be customized to the human user and/or to their pet and can either be provided to the human user in the form of suggestions for modifying the management of their pet, or may be used to automatically modify management of the pet (e.g., override food/fluid portions, feeding intervals and the like that were defined for the pet by the pack members or caretakers) by the smart apparatus system. Examples of advisor information can include: a pet's exercise or activity needed based on the pet's eating schedule, nutrition and activity recommendations based upon the pet's age, breed and region, games to play with a pet for bonding with the caretaker. In some embodiments, the advisor may also be able to search local social networks so that pet events can be found and stored in the server memory and/or caretaker computing device memory. The advisor can then be searched and displayed on the user interface of the caretaker's computing device. For example, in an embodiment the smart apparatus advisor may communicate with social network meet up groups and allow caretakers to search, select and RSVP to meet up events.

As discussed, the smart apparatus system can perform data gathering based upon the monitoring of the food and/or water smart apparatuses. Observations or measurements from the apparatus could be transmitted to the cloud (remote server) and/or monitored remotely by a user caretaker computing device (e.g., a mobile phone or tablet or computing device). Table 5 illustrates food and water information that can be detected and monitored by the food and water smart apparatuses.

TABLE 5

| Food | Water |
| --- | --- |
| How much fed | Amount of water |
| Whether amount was left in apparatus | Water in apparatus yes/no and how much |
| When dog last ate | When dog last drank |
| How fast pet ate | How often and how much pet drinks |
| Is apparatus is overfilled with pet food compared recommended levels (the say when level) - people often overfeed their pets because they feel guilty cutting back. This behavior would be evident here | How often the water is changed |
| How often apparatus is removed/corresponding getting washed | How often apparatus is removed/corresponding to getting washed |
| Duration of feeding (Time between when put apparatus down to when food is finished) | Corresponding drinks relative to 'freshness' of water and do pets prefer fresh water for example encouraging pet care. |

In some embodiments, the smart apparatuses can include apparatus sensors, which can be used to detect the contents and/or characteristics of the contents of the apparatuses. Table 6 illustrates some of the possible food and water sensor detection capabilities.

TABLE 6

| Dog is eating | Dog is drinking |
| --- | --- |
| Kind of food (wet, dry, freeze dried etc.) | Freshness of water (how dirty, presence of bacteria or when last filled) |
| Ingredients (Chicken vs. beef vs. vegetable. |  |
| Food safety and purity: check for spoiled, rotten, allergy triggering ingredient, bacteria, poison) | Water safety and purity: check for unhealthy microbes, poison, chemicals |

The smart apparatuses can be display optical light outputs that can indicate the status of the communications systems of the smart apparatus base as listed in Table 7. All parameters that may be communicated by the smart apparatus to the cloud server and then to caretaker(s) computing device(s).

TABLE 7

| | |
|---|---|
| State: action needed/reminders | Blink green at feeding time based on feeding schedule how many times a day<br>Blink yellow to indicate low battery, battery needs to be changed or charged.<br>Blink blue to indicate connecting to Wi-Fi<br>Solid blue after blinking blue to indicate connected to Wi-Fi<br>Flashing red: urgent attention is needed to the dog, smart apparatus, smart apparatus app or food |
| Base button press | Green light: Feed pet. Pet HAS NOT been fed within set parameters of scheduled feeding time avoiding double feeding.<br>Red light: Do not feed—dog HAS been fed within set parameters of scheduled feeding time |

In an embodiment, the user may press and hold the base button to reset tares the weight sensor of the smart apparatus base. After resetting the tare the detected weight on the smart apparatus base scale, will be calibrated as zero. In some embodiments, different apparatuses can be used with the smart apparatus base. The base may be calibrated to a first apparatus and the recalibration process can be repeated when a different sized scale is placed on the base to recalibrate the weight reading to zero so that only the food or water placed in the apparatuses are weighed. In an embodiment, the caretaker can press and hold the base button and the base can respond by the light output being solid white and the blinking white twice to let the caretaker know when the tare has been set.

Various parameters may be controlled remotely for the smart apparatus system as listed in Table 8 through the user interface of a caretaker's computing device which can be a smart phone.

TABLE 8

| Food | Water |
|---|---|
| Right amount of food - weight/volume - the 'say when' amount to optimize meal size | Recommended amount of water |
| Schedule for action/communication (see above) meal time reminders | Schedule for action/communication (see above) |
| Emergency alert - from a push Notification | Emergency alert - from a push notification |
| Fed/not fed schedule | Change water/do not change water |
| Color LED to blink, breathe and Behavior | Color LED to blink, breathe and behavior |
| Remote tare - tare without pressing the button | Remote tare - tare without pressing the button |
| Dog food ingredients/type of food | Water apparatus or not water apparatus |

The mobile computing devices of the caretakers can be configured with differential access settings and privileges for: Information shared, Alert types, Notification types based on a caretaker hierarchy as listed in Table 9.

TABLE 9

| | |
|---|---|
| Primary caretaker | Setting: set as primary caretaker Set to Home or Away<br>Set to any status to trigger communication rules i.e. vacation as opposed to home or away<br>Set geofence rules<br>Set up pack - direct order of worry-free care ladder for phone calls and reminders to feed the dog/care for the dog<br>Communication preferences: text/message/call/email<br>Create multiple packs depending on situation or geofence rules |

TABLE 9-continued

| | |
|---|---|
| Supporting caretaker | Within app: Communication rules and preferences Reminders |
| Information Shared: Caretaker | Away mode provides more information to owner Primary and is more proactive about messaging and logging to give the owner peace of mind.<br>Shared information can include:<br>Reassurance pet has been fed or if pet has not been fed smart apparatus system can transmit feeding reminders to secondary caretaker(s),<br>Log of reminders sent to other caretakers so no action necessary, Emergency alerts:<br>dog food recall, change in eating or drinking habits; Automatic detailed messages to 'alpha' caretaker(s) based on preferences. |
| Information Shared: Supporting Caretaker caretaker | Feeding instructions, schedule reminders for the caretaker such as how much pet food to feed the pet and when to feed the pet.<br>Feeding schedule reminders: within hourly range of pre-set schedule<br>Feeding instructions: amount to feed, stop filling the apparatus signal when proper amount of food placed in apparatus.<br>Emergency alerts: dog food recall, change in eating or drinking habits<br>Auto-message 'alpha' caretaker when task |
| Alert types | In app messaging, vibration, email, text (app not needed), phone call |
| Notification types | Dog has been fed, dog is eating, dog is drinking, changes in behavior |

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A smart tableware apparatus system comprising:
a food container;
a food container base for supporting the food container, the food container having: a food container weight sensor, a food container memory, a food container processor coupled to the food container weight sensor, and a food container radio frequency transmitter; and feeding software running on a mobile computing device having: a visual display, a mobile radio frequency transceiver and a mobile computing processor coupled to the visual display and mobile radio frequency transceiver;

wherein food weight information is transmitted from the food container radio frequency transmitter to the mobile radio frequency transceiver and the weight information is used to calculate a caloric value, wherein the food container base processor is coupled to the memory for storing a predetermined weight corresponding to a predetermined amount of food, and when the food is placed in the food container, the food container weight sensor detects the weight of the food and the food container processor transmits a signal which actuates an indicator on the visual display of the mobile computing device when the predetermined amount of food is placed on the food container.

2. The smart apparatus system of claim 1 further comprising:

a server having a processor coupled to a database for storing user information;

wherein server communications with the food container processor through a network and the food container processor transmits food weight information detected by the food container weight sensor to the server and the food weight information is stored in the database.

3. The smart apparatus system of claim 1 wherein the caloric value is displayed on the visual display of the mobile computing device.

4. The smart apparatus system of claim 1 wherein the food container base processor transmits a fed signal through the food container radio frequency transmitter to the mobile radio frequency transceiver and the mobile computing processor displays user feeding information on the visual display.

5. The smart apparatus system of claim 1 wherein when the food is placed in the food container, the food container weight sensor detects an initial weight of the food and changes in the weight of the food, the food container processor transmits the initial weight of the food and the changes in the weight of the food to the mobile computing device.

6. The smart apparatus system of claim 5 wherein mobile computing device displays the initial weight of the food and the changes in the weight of the food.

7. The smart apparatus system of claim 1 wherein the food container base include a button coupled to the food container base processor which is coupled to a memory for storing a feeding schedule and wherein the button is pressed to interrogate the food container base processor which causes the food container visual display to indicate when the food has been placed in the food container in compliance with the feeding schedule or when the food has not been placed in the food container out of compliance with the feeding schedule.

8. The smart apparatus system of claim 7 wherein the feeding schedule including a daily quantity of the food placed in the food container.

9. The smart apparatus system of claim 1 wherein the food container includes a visual display which is a multi-colored light within the food container base.

10. A smart apparatus system comprising:

a first food container;

a second food container a food container base for supporting the first food container and the second food container, the food container base having: a first food container weight sensor, a second food container weight sensor, a food container base radio frequency transmitter, and a food container radio frequency transmitter; a food container base processor coupled to the first food container weight sensor, the second food container weight sensor, and the food container base radio frequency transmitter;

feeding software running on a mobile computing device having: a visual display, a mobile radio frequency transceiver, a memory, and a processor coupled to the visual display, the memory, and mobile radio frequency transceiver;

wherein when the food is placed in the food container, the food container weight sensor detects the weight of the food and the food container processor transmits a signal which actuates an indicator on the visual display of the mobile computing device when the predetermined amount of the food is placed on the food container.

11. The smart apparatus system of claim 10 further comprising:

a server having a processor coupled to a database for storing user information;

wherein server communications with the food container processor and the food container processor transmits food weight information detected by the food container weight sensor and the food weight information is stored in the database.

12. The smart apparatus system of claim 10 further comprising:

a liquid container; and a liquid container base for supporting the liquid container, the liquid container base having: a liquid container weight sensor, a liquid container base radio frequency transmitter, a liquid container base processor coupled to the liquid container weight sensor, and the liquid container radio frequency transmitter;

wherein the liquid container base processor actuates the liquid container visual output on the display of the mobile computing device when the liquid container is empty.

13. The smart apparatus system of claim 12 wherein the liquid container base processor transmits a liquid apparatus empty signal when the liquid container is empty through the liquid container radio frequency transmitter to the mobile radio frequency transceiver and the mobile computing processor displays liquid apparatus empty information on the visual display.

14. The smart apparatus system of claim 12 wherein liquid is placed in the liquid container, the liquid container weight sensor detects an initial weight of the liquid and changes in the weight of the liquid, the liquid container processor transmits the initial weight of the liquid in the liquid container and the changes in the weight of the liquid to the mobile computing device.

15. The smart apparatus system of claim 14 wherein mobile computing device displays the changes in the weight of the liquid.

16. The smart apparatus system of claim 10 wherein when the food is placed in the food container, the food container weight sensor detects an initial weight of the food and changes in the weight of the food, the food container processor transmits the initial weight of the food and the changes in the weight of the food to the mobile computing device.

17. The smart apparatus system of claim 16 wherein mobile computing device displays the changes in the weight of the food.

18. The smart apparatus system of claim 10 wherein the food container base include a button coupled to the food container base processor which is coupled to a memory for storing a feeding schedule and wherein the button is pressed to interrogate the food container base processor which causes the food container visual display to indicate if food has been placed in the food container in compliance with the feeding schedule or if the food has not been placed in the food container out of compliance with the feeding schedule.

19. The smart apparatus system of claim 10 wherein the feeding schedule including a daily quantity of the food placed in the food container is determined by a weight and an age of a user.

20. The smart apparatus system of claim 10 wherein the liquid container visual display is a multi-colored light within the liquid container base.

21. A smart tableware apparatus system comprising:
 a food container;
 a food container base for supporting the food container, the food container having: a food container weight sensor, a food container processor coupled to the food container weight sensor, and the food container radio frequency transmitter; and
 feeding software running on a mobile computing device having: an output device, a mobile radio frequency transceiver, and a mobile computing processor coupled to the output device;
 wherein the food container base processor is coupled to the memory for storing a predetermined weight corresponding to a predetermined amount of the food, and when the food is placed in the food container, the food container weight sensor detects the weight of the food and the food container processor transmits a signal which actuates the output device of the mobile computing device when the predetermined amount of the food is placed on the food container.

22. The smart apparatus system of claim 21 further comprising:
 a server having a processor coupled to a database for storing user information;
 wherein server communications with the food container processor through a network and the food container processor transmits food weight information detected by the food container weight sensor to the server and the food weight information is stored in the database.

23. The smart apparatus system of claim 21 wherein the food container base processor transmits a fed signal through the food container radio frequency transmitter to the mobile radio frequency transceiver and the mobile computing processor displays user feeding information on the visual display.

24. The smart apparatus system of claim 21 wherein when the food is placed in the food container, the food container weight sensor detects an initial weight of the food and changes in the weight of the food, the food container processor transmits an initial weight of the food and changes in the weight of the food to the mobile computing device.

25. The smart apparatus system of claim 24 wherein the output device of the mobile computing device is a visual display that displays an initial weight of the food and changes in the weight of the food on the visual display.

26. The smart apparatus system of claim 21 wherein the food container base include a button coupled to the food container base processor which is coupled to a food container memory which stores a feeding schedule and wherein the button is pressed to interrogate the food container base processor the food container visual display indicates when the food has been placed in the food container in compliance with the feeding schedule or when the food has not been placed in the food container out of compliance with the feeding schedule.

27. The smart apparatus system of claim 26 wherein the feeding schedule including a daily quantity of the food placed in the food container.

28. The smart apparatus system of claim 21 wherein the food container includes a light within the food container base, when the food is placed in the food container, the food container weight sensor detects the weight of the food and the food container processor transmits a signal which actuates the light when the predetermined amount of the food is placed on the food container.

* * * * *